(12) United States Patent
Sefcik et al.

(10) Patent No.: US 7,430,303 B2
(45) Date of Patent: Sep. 30, 2008

(54) TARGET DETECTION METHOD AND SYSTEM

(75) Inventors: Jason Sefcik, Orlando, FL (US); Harry C. Lee, Maitland, FL (US); Teresa L. Olson, Winter Garden, FL (US)

(73) Assignee: Lockheed Martin Corporation, Orlando, FL (US)

( * ) Notice: Subject to any disclaimer, the term of this patent is extended or adjusted under 35 U.S.C. 154(b) by 828 days.

(21) Appl. No.: 10/400,536

(22) Filed: Mar. 28, 2003

(65) Prior Publication Data

US 2003/0185420 A1 Oct. 2, 2003

Related U.S. Application Data

(60) Provisional application No. 60/368,150, filed on Mar. 29, 2002.

(51) Int. Cl.
*G06K 9/00* (2006.01)
(52) U.S. Cl. .................. 382/103; 382/199; 348/94
(58) Field of Classification Search .......... 382/103, 382/106, 107, 168, 169, 172, 178, 193, 194, 382/199, 201, 203, 209, 236, 243, 259, 274, 382/276, 237, 149, 174, 181, 305; 345/419; 342/64; 348/94, 97
See application file for complete search history.

(56) References Cited

U.S. PATENT DOCUMENTS 5,341,142 A * 8/1994 Reis et al. ................... 342/64
5,673,339 A * 9/1997 Lee ............................ 382/236
5,694,487 A * 12/1997 Lee ............................ 382/201
6,072,889 A * 6/2000 Deaett et al. ............... 382/103
6,556,195 B1 * 4/2003 Totsuka et al. .............. 345/419
6,850,646 B1 * 2/2005 Silver et al. ................. 382/199
7,062,099 B2 * 6/2006 Li et al. ..................... 382/237
7,200,259 B1 * 4/2007 Gold et al. .................. 382/149

* cited by examiner

*Primary Examiner*—Seyed Azarian
(74) *Attorney, Agent, or Firm*—Birch, Stewart, Kolasch & Birch, LLP

(57) ABSTRACT

A method and system detects candidate targets or objects from a viewed scene by simplifying the data, converting the data to gradient magnitude and direction data which is thresholded to simplify the data. Horizontal edges within the data are softened to reduce their masking of adjacent non-horizontal features. One or more target boxes are stepped across the image data and the number of directions of gradient direction data within the box is used to determine the presence of a target. Atmospheric attenuation is compensated. The thresholding used in one embodiment compares the gradient magnitude data to a localized threshold calculated from the local variance of the image gradient magnitude data. Imagery subsets are containing the candidate targets may then be used to detect and identify features and apply a classifier function to screen candidate detections and determine a likely target.

72 Claims, 19 Drawing Sheets
(3 of 19 Drawing Sheet(s) Filed in Color)

| a | b | c |
|---|---|---|
| d | e | f |
| g | h | i |
FIG. 2A
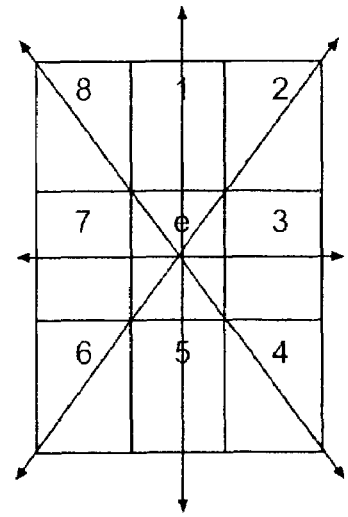
FIG. 2B
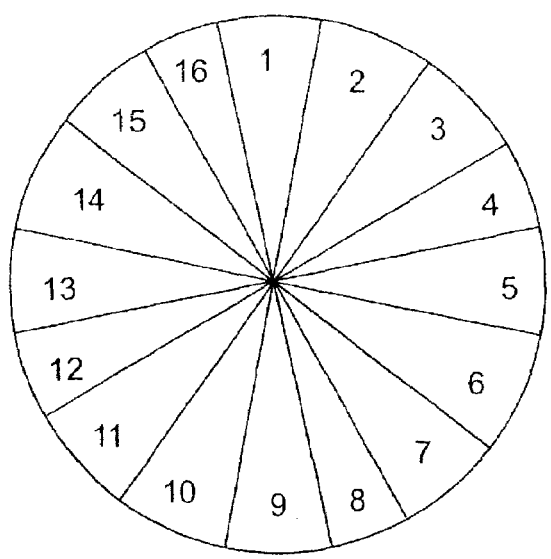
FIG. 3

SOBEL MAGNITUDE
IMAGE

SKEW DIAG
IMAGE

SOBEL MAG WGTD
IMAGE

FIG. 15A
FIG. 15B
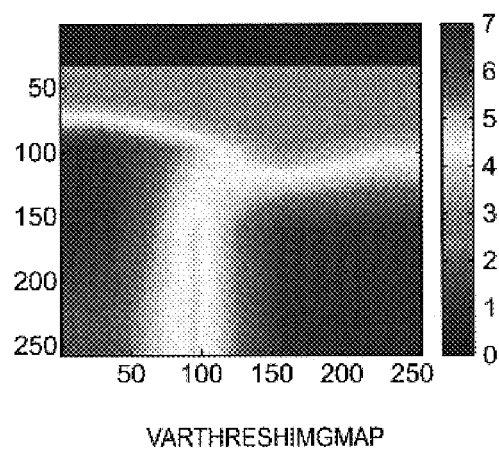
VARTHRESHIMGMAP
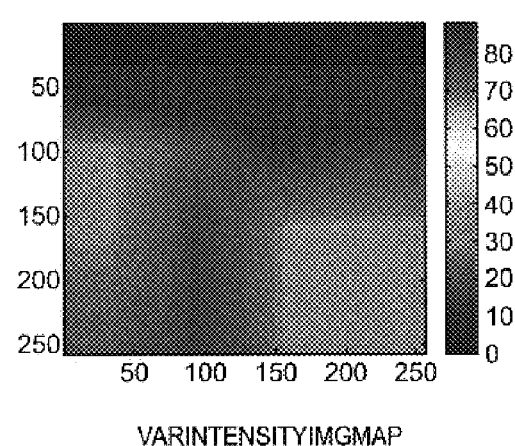
VARINTENSITYIMGMAP

TARGET DETECTION METHOD AND SYSTEM

This application claims priority on provisional Application No. 60/368,150 filed on Mar. 29, 2002, the entire contents of which are hereby incorporated by reference.

FIELD OF THE INVENTION

The present invention relates to image processing methods and systems including a processor utilizing an algorithm for processing acquired imagery data and more particularly to such a method, system and associated algorithm for identifying candidate objects or targets from background imagery data.

BACKGROUND OF THE INVENTION

There are many situations where imagery data is collected for the purpose of detecting candidate objects or targets from collected background data. One of the more difficult aspects of object or target detection is to improve the detection of objects or targets while minimizing False Alarms. Processing and computing requirements for a given target detection performance are also highly variable. Obviously, it is desirable to improve target detection capability while minimizing processor load and likelihood of false detection. A number of target detection schemes have been used in the past.

Reis et al., U.S. Pat. No. 5,341,142, discloses a target acquisition and tracking system for a focal plane array seeker that uses maximum likelihood classification, the video spatial clustering and a target-to-interference ratio. The approach disclosed in Reis et al. primarily uses hierarchical edge based analysis and requires relatively intensive processing requiring relatively great processor speed for a given target detection performance.

Deaett et al., U.S. Pat. No. 6,072,889 discloses a system and method for imaging target detection by identifying image pixels of similar intensity levels, grouping contiguous pixels with similar intensity levels into regions, calculating a set of features for each region and qualifying regions as possible targets in response to the features. Deaett et al. then discriminates the background by identifying the image pixels of similar intensity levels into regions, calculating a set of features for each background region, qualifying background regions as terrain characteristics in response to the features and analyzing the qualified terrain characteristics and qualified target candidates to determine and prioritize targets. Simple pixel association at the gray level is performed to identify image pixels of similar intensity levels and grouping contiguous pixels with similar intensity into regions. Deaett et al. then uses feature extractors and classifiers to identify targets.

SUMMARY OF THE INVENTION

While a number of target detection techniques are known, the system and method of the present application uses a combination of techniques to improve target detection and discrimination without undesired increases in the rate of false alarms. The algorithm processing techniques used in accordance with the teachings of the present application seek to improve candidate target identification performance while retaining reasonable processing load, enabling (although not requiring) the use of available a single processor.

In one exemplary embodiment, by attaching the algorithm to the front end of an infrared imaging tracker algorithm, the ability to correctly determine and separate targets from non-targets is increased. Thus, by utilizing the techniques of the present application, the false alarm rate decreases while the probability of detecting targets increases.

The system and method of the present application desirably use a number of techniques to simplify processing of acquired imagery and improve the successful identification of candidate targets while reducing both processing load and false target identification. A combination of these techniques produces unexpectedly improved performance and is in itself an important advance. However the individual techniques making up this combination are similarly advances in the art.

For example, the use of an atmospheric attenuation compensation algorithm compensates for range related image deterioration, particularly in infrared sensing systems.

The attenuation of the effect of horizontal edges in the detected imagery due to, for example, tree lines and roads, is beneficial in reducing the effect such horizontal lines have on the detection of adjacent features.

The system of one embodiment of the invention utilizes gradient edge magnitude and direction to detect candidate targets. The gradient image data is preferably compared to a threshold to simplify the image data from which candidate targets are identified. While any thresholding technique may be used, the present application describes a variable thresholding technique that may be beneficially used to improve candidate target identification. This technique compares the gradient magnitude data of the pixels obtained from the detected imagery to a localized threshold typically calculated based on localized gradient magnitude values, and more specifically to variance of the localized gradient magnitude. In this way localized variations in the scene contrast are used to better define the threshold to use in that locality of the imagery under examination.

In one embodiment, detection of objects or targets in the image data is performed by identifying areas where a large diversity of edge directions in a region of interest. This technique is enhanced by defining the region of interest as a target box sized in relation to the expected target size in accordance with another aspect of the invention.

It should be apparent from the description in the present section and in the detailed description that the present application discloses a number of inventive features that improve the efficiency and performance of the detection of candidate objects or targets in imagery to be examined. While this summary has highlighted many of the significant features disclosed and claimed in the present application, it should be apparent that a number of other features are present and are subject matter properly covered by the present application.

BRIEF DESCRIPTION OF THE DRAWINGS

The patent or application file contains at least one drawing executed executed in color. Copies of this patent or patent application publication with color drawing(s) will be provided by the Office upon request and payment of the necessary fee.

A more complete understanding of the present invention will become apparent from the following description taken in conjunction with the accompanying drawings, wherein:

FIG. 2A is an exemplary illustration of a Sobel neighborhood utilized in accordance with the teachings of the present application;

FIG. 2B is an exemplary illustration of an 8 direction Sobel map;

FIG. 3 is an exemplary illustration of a 16 direction Sobel map;

FIG. 15 is an exemplary illustration of a variable threshold image map and a variable intensity image map;

DETAILED DESCRIPTION OF EMBODIMENTS

The various aspects of the invention disclosed in accordance with the teachings of the present application are described in greater detail in the present detailed description. It is apparent that the embodiments disclosed herein are exemplary and that alternative embodiments of the claimed invention may be devised without departing from the spirit or scope of the present invention. It should be noted that like elements in the figures bear like reference numbers.

The invention will now be described with reference to the appended drawings in the sections that follow. Headings have been used to help the reader follow the terminology used and to facilitate understanding, recall and cross-referencing of the various portions of the method and system and the algorithm utilized therein.

Object or Target Detection Algorithm and Hardware

Figure 1A:
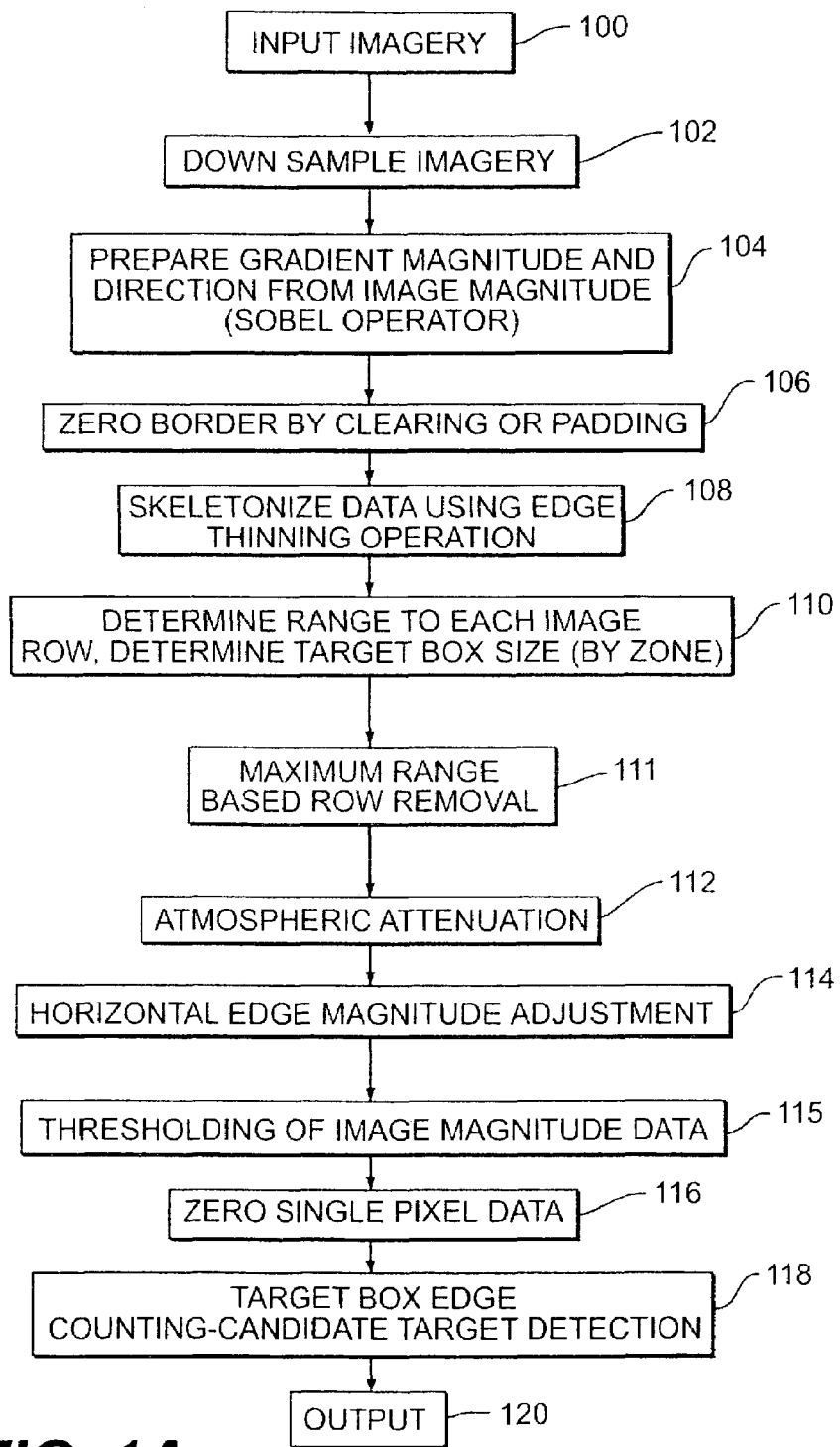
FIG. 1A is an exemplary illustration of the flow utilized in the target detection system according to the teachings of the present application.

The organization and flow of the object or target detection algorithm utilized in one embodiment of the method and system of the present application are disclosed with reference to FIG. 1A. The target detection algorithm may be embodied in any suitable system receiving data from one or more image sensing arrays and is used to detect candidate targets for later identification or classification. The target detection algorithm of this embodiment of present application can identify targets on the ground, in the air and against an ocean background from collected imagery data. The data may be examined for targets as collected or after storage and later recall. The target detection method and system of the present application is normally utilized in connection with a hardware system, an exemplary embodiment of which is disclosed in FIG. 1B. It should be apparent that the target detection algorithm utilized in the present application, while preferably installed into a special purpose processing environment relying on a single processor, may be used in a general purpose computing environment with a single primary processor or with a hardware platform using plural processors as would be understood by one of ordinary skill in the art.

A sensor or group of sensors 126 is used to collect imagery data. In one embodiment the imagery data is infrared data from an infrared sensing array viewing a scene where a prospective target may be located. Thus, while in one embodiment the sensor may be an array of infrared sensors, the method and system of the present application may be used with any multidimensional image data (two or more dimensions) produced by at least one sensor set. For example, the sensor may detect visible light, radar or other image data. Further, in accordance with the teachings of the present application, the principles disclosed herein may be used in examining any form of image data including data generated by integrated sensor systems making use of plural kinds of imaging sensors producing plural kinds of data (e.g. infrared or thermal and another form of radiation such as visible light or radar reflection). The principals of the present application may also be used in a system acquiring imaging data from plural sources, either directly or by wireless transmission from sources separated from each other as would occur to one of ordinary skill in the art. Those skilled in the art will appreciate the applicability of the system of the present application to image data produced by various means.

In one embodiment, the imagery data collected is processed by the system and method of the present application by using the target detection algorithm in a processing device or processor 128. For example, the target detection algorithm may be used in real-time with a processor 128 which in one embodiment may be a single G4 500 MHz processor running at a 15 to 20 Hz frame rate. A memory 129 may be associated with the processor as apparent to one of ordinary skill, the memory storing the algorithm and intermediate data results as is apparent from the description presented herein. The memory 129 may be any suitable memory as would occur to one of ordinary skill.

The data and target detection information determined from the processor 128 is then output by an output device 130. This output provided by the output device may be forwarded to a human operator, or to the guidance and control system for a missile or other weapon system, to another processor or fire control computer, etc. For example, the output device may be a display identifying the targets to a human operator or may be a device for supplying output information to another electronic processing device including a fire control or missile guidance system or the like. The techniques of the present application may also be used in for example machine vision and robotic control or any other suitable application.

The detection algorithm in one embodiment combines all of the aforementioned image processing functions in a seamlessly integrated manner and the computation efficiency of the algorithm can support real time image frame rates. Each processing step furthers the computational efficiency of the algorithm and builds upon the results of the other steps, while increasing the likelihood of target detections and at the same time reducing false target detections.

FIG. 1A illustrates an exemplary algorithm flow with the steps occurring in an identified order. However, the order of the steps may of course be varied to the extent the output of one step is not required in the other step. The steps can be run sequentially as shown, or alternatively a subset of the steps can be run in parallel with another subset or the processing steps.

For example, a reduced or streamlined algorithm might adopt only steps 100, 104, 110, 115, 118, 120, 122 and 124. These steps correspond to the same method step and associated functionality depicted in FIG. 1A. Steps 102, 106, 108, 111, 112, 114, 116, and 118 may be individually or collectively eliminated from the detection algorithm with performance that may be suitable for a particular application. It should be understood that various aspects of the present application may be used together as would occur to one of ordinary skill in the art without utilizing all of the elements thereof. However, the addition of these steps in FIG. 1A improves the computational efficiency of the process of target identification, resulting in improved system performance, and thus illustrate one embodiment of the present application. Thus, different combinations of algorithmic method steps will affect speed of the algorithms, possible false detections encountered, and other intermediary processing outcomes. Accordingly, it should be apparent that other permutations of the algorithm can be developed without departing from the spirit and scope of the present invention.

Input Imagery and Initialize

Imagery data is input into the algorithm at step 100. An initialization sequence is run to provide this starting point. A part of the initialization sequence is the generation of lookup tables useful in simplifying processing as is well known to those skilled in the art. For example, the counting of the number of gradient directions within a target box is discussed in further detail with reference to Step 118. In this process, a binary number representative of the number of edge directions is produced. In one embodiment of the invention the conversion of the binary number to a edge number is performed by a look up table that is generated during initialization. Such look up tables may be desirably generated at this time.

Downsample Imagery

Once image data is input and any look up tables are prepared in step 100, the image data is then desirably downsampled by a downsampling imagery step 102 to reduce the processing load on the processor 128. In general, downsampling is the reduction of an original data set into a more manageable subset that still retains identity attributes of the original data that has been downsampled. Downsampling helps to reduce the size of the image processing operators that are used and makes processing easier and able to run faster. Downsampling need not be performed, however, the incorporation of a downsampling step 102 can improve the operation and execution of the method and system of the present application and the performance of the algorithm used therein.

Initially, before any processing is done on the imagery, a determination of whether or not the image should be downsampled is required. The criteria for this decision are desirably range dependent (distance to target) and are based on the level of detail desirably processed. When greater ranges are involved making greater detail desirable, greater image detail is retained by utilizing the complete set of sensed image pixels or by downsampling to a lesser degree.

Downsampling reduces the processing load and the demands on the hardware of this system. Also, the process of downsampling the imagery acts like a smoothing filter, which at close ranges allows the detection algorithm to continue detecting the whole target instead of locking onto the image pixels in the image data that represent the interior structure or interior features (e.g. imagery data subsets) associated with the target.

The process of downsampling is desirably based on range. This both improves performance and computational efficiency. In one embodiment, when a primary targets range exceeds the following predefined values then the image is downsampled by a 2/1 ratio.

Downsample imagery once at 2500 m
Downsample imagery twice at 1250 m
where m is meters.

This downsampling of the imagery in accordance with the teachings of the present application is initiated by blurring the image. In one exemplary embodiment, the image is blurred by doing a 2-D convolution between the current image and the following 2×2 mask.

| .25 | .25 |
|-----|-----|
| .25 | .25 |

Convolution operations and operators are well known to those in the image processing arts. Typically, convolution is performed in the spatial domain, where a kernel of numbers is multiplied by each pixel and its neighbors in a region. The results of this multiplication are summed, and the results are placed in the original pixel location. This operation is applied to all of the pixels in an image. The original pixel values are used in the multiplication and addition, and the new derived values are used to produce a new image. Convolution is used for smoothing and derivative operations in one embodiment of the present invention.

Once the image has been blurred by the 2-D convolution between the current image and the following 2×2 mask, the image is then downsampled by taking every other pixel in the imagery rows and columns matrix. This downsampling process is represented by the following equation:

Downsampled image=Original Image(1:downsample*2:end, 1:downsample*2:end)

For example, in one embodiment of the present application the image is introduced as a 256×256 array of intensity samples. After downsampling, a 256×256 image becomes a 128×128 image. Once the detection algorithm starts downsampling it will continue to do so until the algorithm can perform no further downsampling. In the embodiment described herein, the imagery is only be downsampled twice. However, it should be apparent that downsampling can be undertaken as desired depending on the circumstances and requirements of a given algorithm. In one embodiment, it has been determined that once the imagery reaches a 64×64 size, then no more downsampling is desirable. Furthermore, when the image attains a size smaller than 64×64, edge data is lost which may undesirably effect detection results.

Gradient Edge Evaluation

In the embodiment of FIG. 1A, after downsampling, the gradient direction and magnitude data is prepared from the image data in step 104. While any technique for obtaining gradient data may be used, in one preferred embodiment the gradient of the image data is taken by applying a Sobel function to the downsampled image data. A Sobel function is one type of gradient operator. Other types of gradient operators such as Roberts, Smoothed (Prewitt), Isotropic, Compass and Laplace operators could be utilized in applying the concepts of the present application, as those skilled in the art will readily understand. However, in the exemplary embodiment provided, the Sobel operator will be used and described. Detail of the Sobel operator algorithm used in the present application is disclosed in a copending application (LM Ref.: EM-1933) filed Mar. 6, 2003 and entitled "Method and System for Identifying Objects in an Image" by Harry C. Lee, one of the inventors of the present application and assigned to the assignee of the present application (herein incorporated by reference).

The Sobel function operates on the intensity values of the image to produce gradient magnitude and direction data. According to one embodiment of the invention, two sets of direction data are created. One set of direction data is 8-direction data and the other is a 16-direction data. This is done since portions of the method desirably benefit from more detailed direction information while other portions of the image data, for example skeletonizing by edge thinning as described in step 108 and feature generation after a candidate target is detected need less accurate direction information which places a lower processing load on that part of the algorithm. In this example, the gradient magnitude image data will be identical for each edge direction image data set.

In an exemplary embodiment, the 16 direction Sobel direction data will only be used to determine the number of edge directions in a target box as will be explained further in the following discussion. Otherwise, the 8 direction Sobel direction data will be used throughout the remainder of the disclosed embodiment of the detection algorithm.

Eight (8) Direction Sobel Operator

To produce 8-direction gradient direction data using a Sobel function, processing is accomplished by operating on each pixel "e" with a neighborhood operator shown in FIG. 2A. The image data processed is gray scale imagery, although Red Green Blue (RGB) values and other image data representations can also be utilized in accordance with the teachings of the present application. This could be performed either by processing different colors separately or by weighing the colors together as would be recognized by one of ordinary skill.

FIG. 2A represents an exemplary embodiment of a Sobel neighborhood and FIG. 2B represents an exemplary embodiment of a direction map. In FIG. 2A, a 3×3 matrix contains values {a,b,c,d,e,f,g,h,i}. This matrix yields both a gradient magnitude value and a gradient direction value. The directions are quantized to one of 8 unique directions (represented by the arrows) as shown in FIG. 2B with exemplary matrix values entered into the 3×3 matrix.

The gradient magnitude and direction values are produced by first processing in the $D_x$ direction and then the $D_y$ direction, for each individual pixel. These individual gradient components are combined via the absolute value or city block distance. Those skilled in the art will appreciate that the city block distance (also known as the "Manhattan distance") represents distances as these distances are measured and traversed by moving along the grid of city streets. Image processing concerns itself with these city block distances, because streets and horizons are important image features that show up in collected imagery sets.

Next, slope is calculated by diving $D_x$ into $D_y$. The slope is then converted into an angular direction by taking the inverse or arc tangent. Last, this angle, which can range from 0 to 360 degrees is converted into one of 8 directions by quantizing the resulting angle every 45 degrees. The direction 1 starts at −22.5 degrees and goes to 22.5 degrees. Each successive direction is obtained by adding 45 degrees to the bounds (bounds defined as −22.5 degrees and going to 22.5 degrees) and 1 to the direction number. This process is illustrated in equation 1.

$$Dx = a + 2 \times d + g - (c + 2 \times f + i) \quad \text{(Eq. 1)}$$
$$Dy = a + 2 \times b + c - (g + 2 \times h + i)$$
$$Mag = \text{abs}(Dx) + \text{abs}(Dy)$$
$$Dir = \arctan\left(\frac{Dy}{Dx}\right)$$

$Dir$ is Quantized to 8 Directions

Sixteen (16) Direction Sobel Operator

In the 16-direction Sobel function, processing is accomplished by operating on each pixel "e" with a neighborhood operator shown in FIG. 2A. This application of a 16-direction Sobel function produces both a gradient value and a gradient direction value. They are placed in the gradient image and direction image, respectively. The directions are quantized to one of 16 unique directions as shown in FIG. 3. The gradient value is produced in the same manner described above with respect to the 8 Direction Sobel Operator. In the case of the 16 Direction Sobel Operator, the slope is then converted into an angular direction by taking the inverse or arc tangent. Last, this angle, which can range from 0 to 360 degrees is converted into one of 16 directions by quantizing the resulting angle every 22.5 degrees. The direction 1 starts at −11.25 degrees and goes to 11.25 degrees. Each successive direction is obtained by adding 22.5 degrees to the bounds and 1 to the direction number.

Zero Border

The output of the Sobel Gradient magnitude and direction determination step 104 is desirably further processed in a Zero Border Step 106. The purpose of the zero border function is to remove or pad the rows and columns of image data residing on the edge of the image after the Sobel magnitude image and direction data. The zero border function zeroes out a predefined number of rows and columns from the edge magnitude imagery. This prevents false edge effects and artifacts in later processing steps that consider or effect the data at a pixel based on the values of adjacent data such as the variable thresholding and target detection which perform processing based on values in a target box surrounding a pixel of interest.

To avoid undesirable artifacts in such data it is desirably necessary to avoid processing of edge data where adjacent pixel values are not present. In one embodiment, edge data of a size preferably equal to ½ the relevant dimension of the largest target box is zeroed to avoid this effect. However, in another embodiment, the edge may be padded with a border of zeros of preferably at least one half of the dimension of the largest target box in the relevant dimension. The zero border function removes all the values or pads the edge with zeros to a specified distance from the edges of an input image. This results in an image that has specific run of zeros on all four of its sides. The zero border function may be performed anytime prior to candidate target detection in step 118. However, since this simplifies data without significant processing load it is desirably performed earlier in the process.

Figure 4:
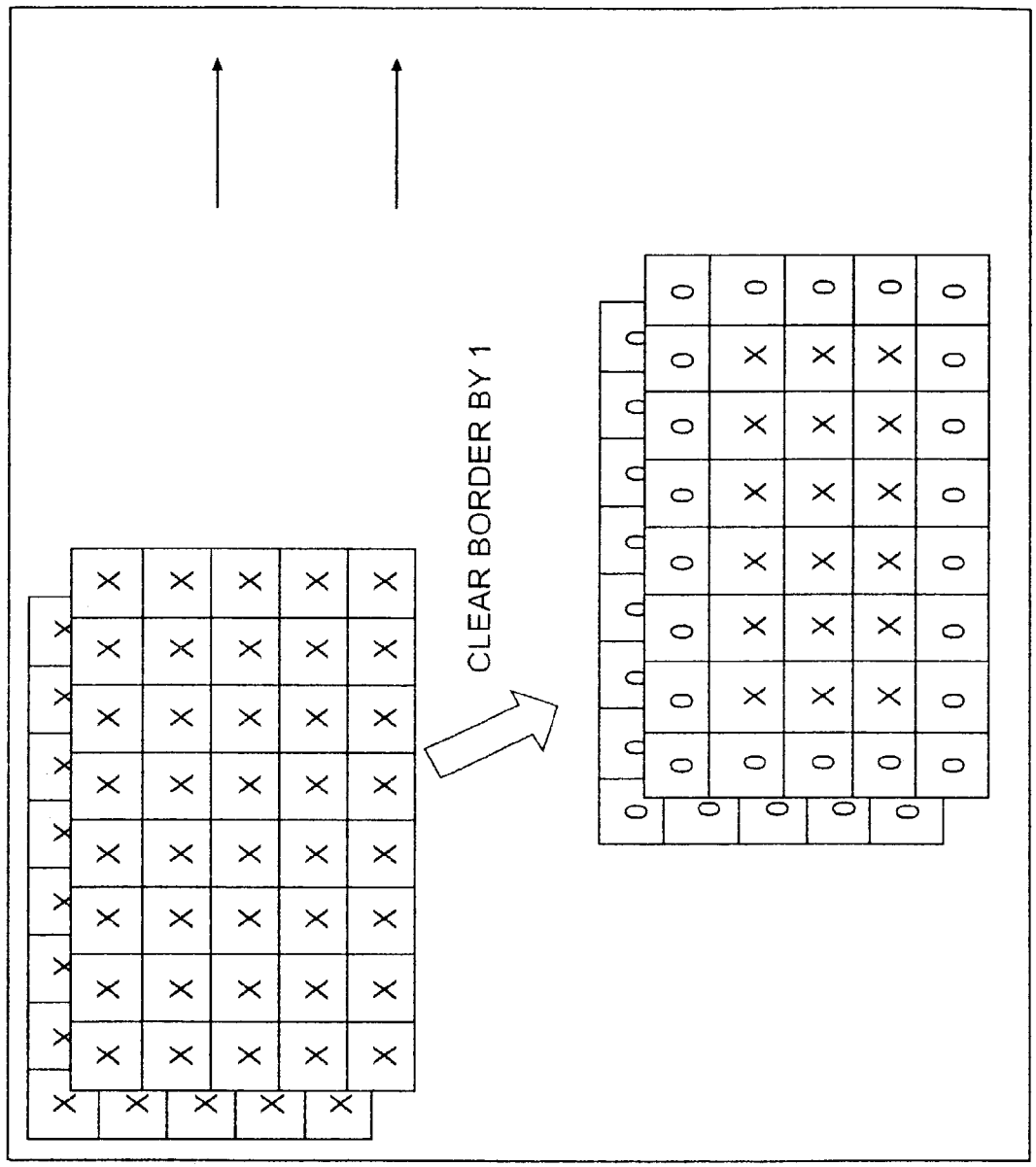
FIG. 4 is an illustrates the effect of the clear border function on image data in accordance with the teachings of the present application.

FIG. 4 illustrates using a sample image and clear border of size "1." Alternatively, a row of zeros may be added. The clear border function is used on both the Sobel gradient magnitude and direction data. Since a value of zero is not one of the 8 directions, this process can be used on the direction image data.

Skeletonize Data

Figure 5A:
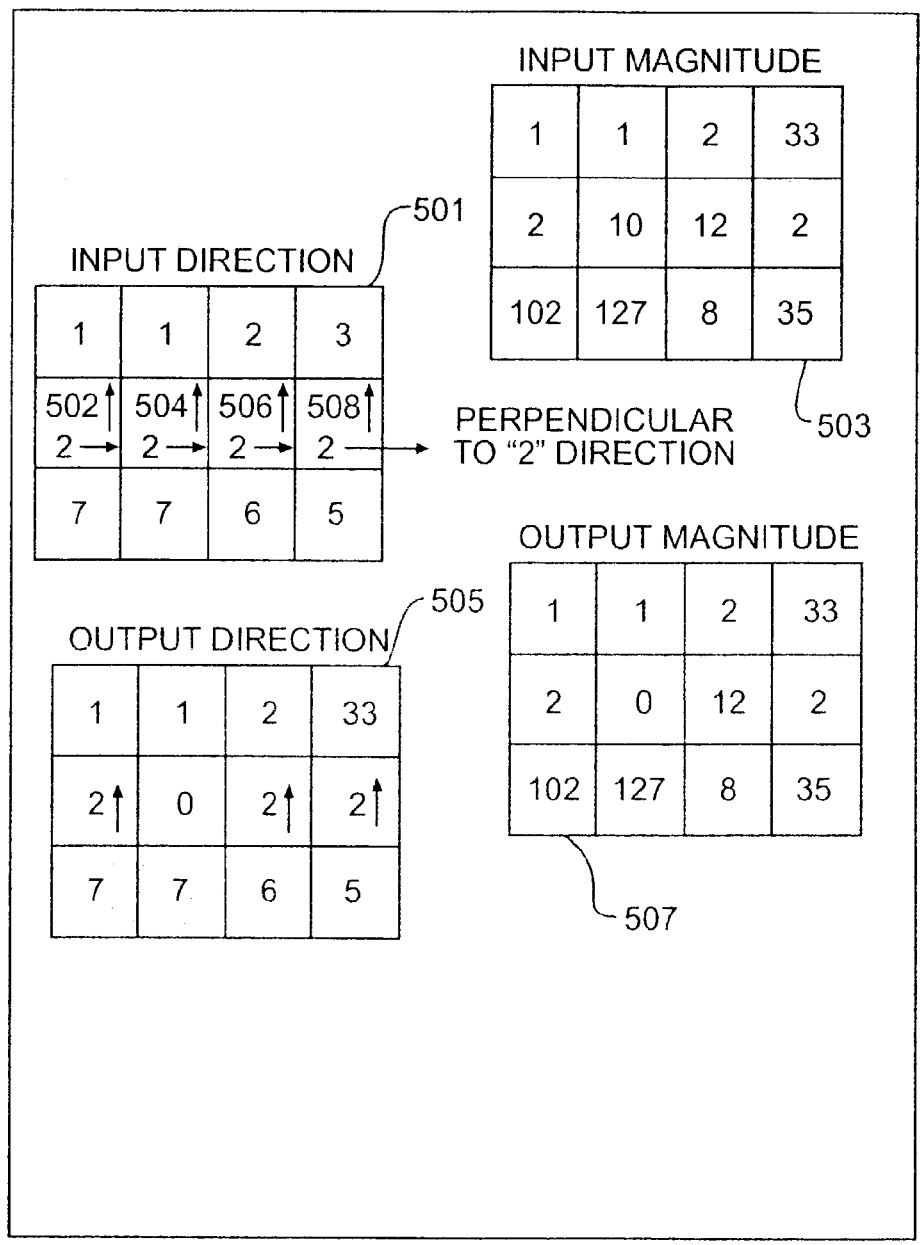
FIG. 5A is an illustration demonstrating an edge thinning technique using magnitude and direction image data produced by the Sobel operator.
Figure 5B:
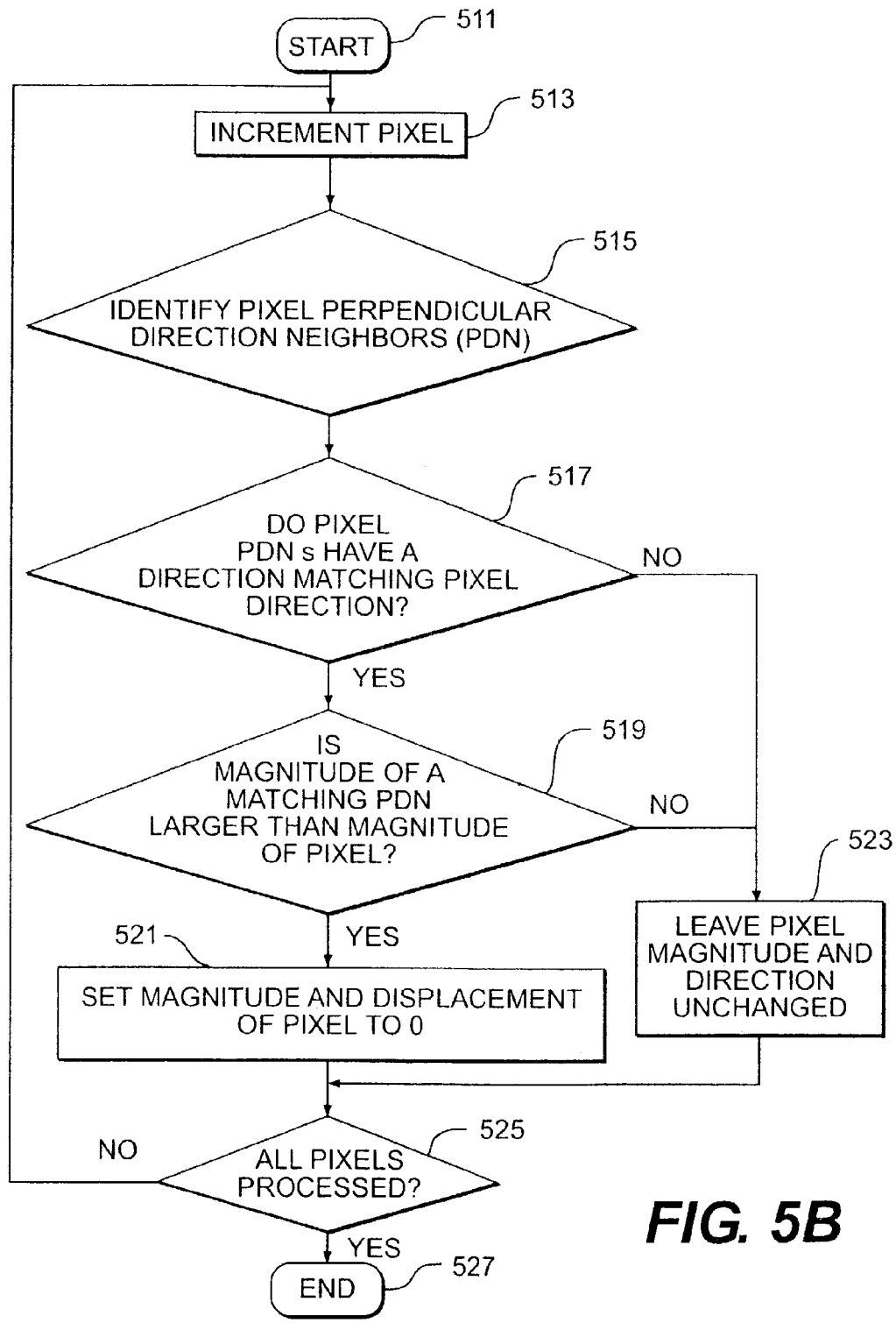
FIG. 5B is a flow chart of an exemplary edge-thinning algorithm.
Figure 6:
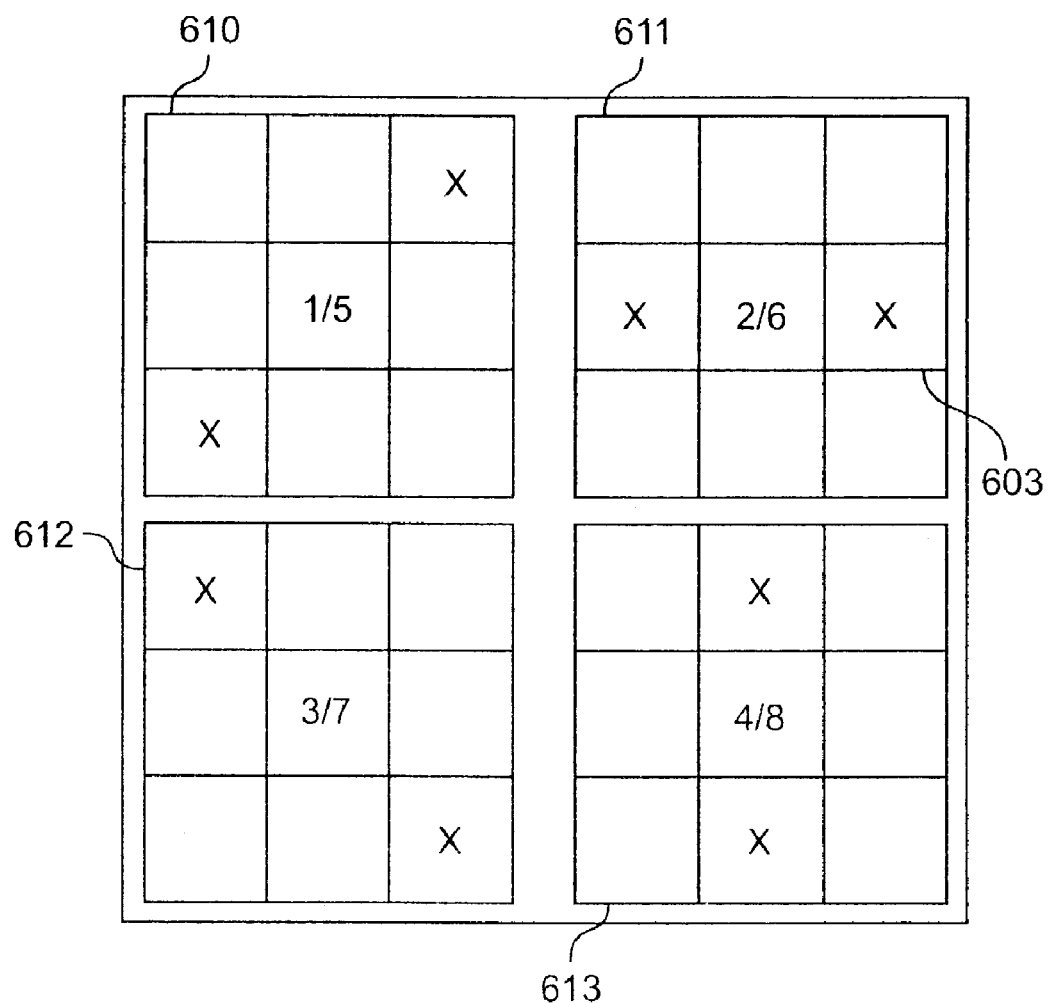
FIG. 6 is an exemplary illustration showing the perpendiculars to each of the edge directions.

At the output of the clear border step 106, Sobel gradient and direction data, is supplied to a skeletonizing data step which has the primary function of further simplifying the image magnitude and direction data. The skeletonized step 108 thins edges in the magnitude and direction data. The purpose of edge thinning is to take all of the edges in the edge magnitude image and to make them only one pixel thick. This will improve the results of the thresholding and candidate target detection steps 115 and 118, described below with reference to FIGS. 5A, 5B and 6. This reduces processing load by eliminating unnecessary data not needed in the processing in the preferred embodiment. FIG. 5A explains operations used in the thin edge function which is embodied in the algorithm explained with reference to the flowchart of FIG. 5B which uses the gradient magnitude and direction image data for each pixel. The algorithm begins at step 511, and the pixel number is incremented by one, from an initial value of zero in step 513. The pixel direction defined by the gradient direction data is examined and the pixel's Perpendicular Direction Neighbors (PDN) are determined at step 515. The PDNs are the pixels located in the direction perpendicular to the direction data of the pixel as illustrated in FIGS. 5A and 6. In the example of FIG. 5A, each of the two center pixels 504, 506 is processed. Two new images of thinned magnitudes and thinned directions are produced in the process.

The edges are thinned by a thinning process which begins by checking the pixel direction and determining the two perpendicular direction neighbors. The perpendicular direction neighbors (PDNs) for each direction 1-8 are illustrated in FIG. 6. Since the directions are symmetric, only four templates 610-613 are required. Example direction "2" (which extends generally vertically in FIG. 6 selects template 611 and defines a first neighboring pixel or PDN 605 located on the left and the second neighboring pixel or PDN 603 on the right. These pixels are identified at step 515 through the use of the appropriate template 611. Thus, for pixel 504 in FIG. 5A, pixels 502 and 504 are the PDNs.

The algorithm then checks at step 517 to see if either of the PDNs 502, 506 have a direction matching the direction of the pixel 502 under test. Here since both of the PDNs 502, 506, have a direction 2 that is the same as that of pixel 504, the answer is yes. In other words, does the pixel at interest and at least one of the PDNs increase in a single direction? If the answer in step 517 is no and neither of the PDN's matches the direction, both pixel direction and associated magnitude are left unchanged as illustrated in FIG. 5B in step 523.

If the thin edge function determines that either PDN, in this case both pixels 502 and 504 matches the direction, the magnitude of the matching PDN must be checked in step 519. For those pixels where one or both of the PDNs that are in the same direction have a higher magnitude than that of the pixel under test, the pixel under test is eliminated in step 521 by setting both the direction and magnitude values to zero. In the case of pixel 504, its magnitude is 10 which is less than the magnitude of PDN 506 which had the same direction and a magnitude of 12, and the answer in step 519 is therefore yes. Thus both the magnitude and direction of pixel 504 is set to zero, simplifying the data. If the answer is no, the pixel magnitude and direction are left unchanged as illustrated in FIG. 5B at step 523. At step 525, it is determined whether all pixels have been processed. Since the answer in this case is no, the algorithm of FIG. 5B returns to the start and the pixel is incremented in step 513 to repeat the process for pixel 506.

Pixel 506 in FIG. 5A also has a direction of 2. In this example, the PDAs 504 and 508 also have directions of 2 and thus the answer at step 517 is again yes. Here, the Pixel under evaluation has a magnitude of 12 and the PDAs 504 and 508 having a matching direction have magnitude values of 10 and 2. Therefore the answer at step 519 is no and the pixel magnitude and direction are left unchanged.

The input images can be processed in any direction for example, left to right and then top to bottom, since the results are the same no matter which way the image is processed. Each pixel is processed one at a time. Thus, pixels having a gradient direction the same as an adjacent neighbor but a lower gradient magnitude are eliminated. This simplifies the magnitude and direction data and may be considered a skeletonization process as it has the effect of simplifying the gradient magnitude and direction data.

Range Calculation and Target Box Size Determination

In Step 110, the range to each line of the image is calculated and the vertical and horizontal target box sizes are calculated. The target box size for different zones of the image data are also desirably calculated. While in one preferred embodiment, the box sizes and ranges are calculated here, the actual target box size in each zone is calculated during step 118 as described below. However, for the purpose of clarity and because the order of the steps used in the process, apparatus and algorithm of the present application may be varied target boxes are developed in the present step for ease of explanation. The estimated targets box size in each row of the imagery for targets of interest is calculated. There are several factors including target size and range that may vary the target box size. However, the primary objective of this step is to develop a target box size that will be large enough to encompass a target at a range of interest without incorporating substantial additional area of the image.

In one preferred embodiment, the target box size is related to target range. Accordingly, the estimated range to a prospective target should be calculated for each row in the image data. This may lead to calculation of zones of constant target box height.

An estimate of a typical target size needs to be determined. Since targets of interest for the algorithm can have varying perspective angles associated with them, plural target size boxes may be used for different perspectives of the target. In one embodiment, three typical target size values are used in this calculation, representing front, side and quartering view sizes of the anticipated target. In one operational scenario, the following target characteristics and dimensions are expected to be encountered in a specific target environment and relate to target size as determined from different perspectives, e.g. front, side and quartering:

| Minimum target: | width - 2.5664 m | height - 3.6064 m |
| Average target: | width - 4.9911 m | height - 3.6064 m |
| Maximum target: | width - 7.4159 m | height - 3.6064 m |

One reason for using both minimum and maximum target size boxes is that while the maximum target box might also detect a target from a frontal view, there is a possibility that plural targets might be contained within the maximum size target box. For example, a frontal view of two vehicles parked side by side may be detected as a single target when the maximum target box alone is used. However, the minimum target box would likely detect two targets parked side by side.

Those skilled in the art will appreciate that different size target values from the exemplary ones shown above can be used in different circumstances without departing from the spirit and scope of the present invention. Further, if candidate targets are to have significantly varying sizes, it may be desirable to provide one or more target boxes for each size target.

The present invention can work with targets that are silhouetted against an air, land, sea or space target background environment. Any type of target may be accommodated by this technique. Airplanes, missiles, ships, trucks, railcars and other types of equipment can all be detected, as long as input data emanating from the target can be collected and processed.

For each target size value an estimate of the target size is made at each of the image rows using the image parameters. Once the sizes are calculated, they are used throughout the detection algorithm as needed.

Initially, the sensor height is calculated using the range along the line of sight (LOS) and the depression angle (angle of the sensor from the horizon) as would occur to one skilled in the art. Next, an angular measure at each of the rows is calculated. This analysis requires the depression angle, angle of the field of view (FOV) and the angular subtend of each row.

From here the target range can be calculated at each of the rows. Using this and the estimated target size in meters, the pixel extent can be calculated for both the horizontal and vertical direction at each of the rows. These values are calculated from the following mathematical expressions.

$$\alpha_d = depression\ angle$$
$$r_{LOS} = range\ along\ the\ LOS$$
$$V_{FOV} = vertical\ FOV$$
$$h_T = target\ height$$
$$R_{w/h} = width\ to\ height\ of\ target$$
$$R_{max} = maximum\ range$$
$$r = row\ number$$
$$r_{max} = number\ of\ rows$$
$$\alpha_p = angle\ degrees\ /\ pixel$$
$$n_\alpha = pixels\ /\ angle\ degree$$

$$sensor\ height$$
$$h_s = r_{LOS} \times \sin(\alpha_d)$$
$$\beta_r = angle\ at\ row\ r$$
$$\beta_r = h_s + \frac{V_{FOV}}{2} - \alpha_p \times r$$
$$Target\ range\ at\ line\ number$$
$$R_T = \frac{h_s}{\sin(\beta_r)}$$
$$set\ range\ to\ maximum$$
$$allowed\ at\ horizon$$

(Eq. 2)

Experimentation has shown that to prevent the algorithm from crashing the following two cases need to be addressed.

Case 1
If sensor Height<=0
  Target Range for all 256 rows=LOS Target Range $$v_d = (360/\pi) \times \tan^{-1}(h_T)/R_T$$
$$h_d = v_d \times R_{W/H}$$
$$v_s = n_\alpha \times v_d$$
$$h_s\ n_\alpha \times h_d$$

where $v_s$ is the vertical size of target in pixels and $h_s$ is the horizontal size of target in pixels Case 2
If angle at row(i)<=0
  Target Range at row(i)=2*maximum range These cases prevent the values from being negative unduly complicating processing.

Zone Generation

Desirably, the target box size need not be continuously varied as range varies within the image. Consequently, it is desirable to vary the target box size while keeping each target box of a constant size within a zone of the image. Consequently, the image gradient magnitude and direction data is preferably divided into plural zones of constant target box size (constant target height).

The specific zones in the imagery are generated by the following procedure. First, find the minimum and maximum values in the min verPixSize array. This array is assembled based on the range information calculated as described above. The range and pixel extent can easily be used to determine the vertical height of a pixel (normally constant within a row) within the imagery. Then, using the following equation to generate the correct number of zones in the imagery that will be used.

NumOfZones=(max(min verPixSize)−min(min ver-
    PixSize))+1                                                          (Eq. 3)

Thus if the target height is 3.6 m and from 5 to 9 pixels represent that height, the number of zones would be 9−5+1 or 5 zones.

Figure 7:
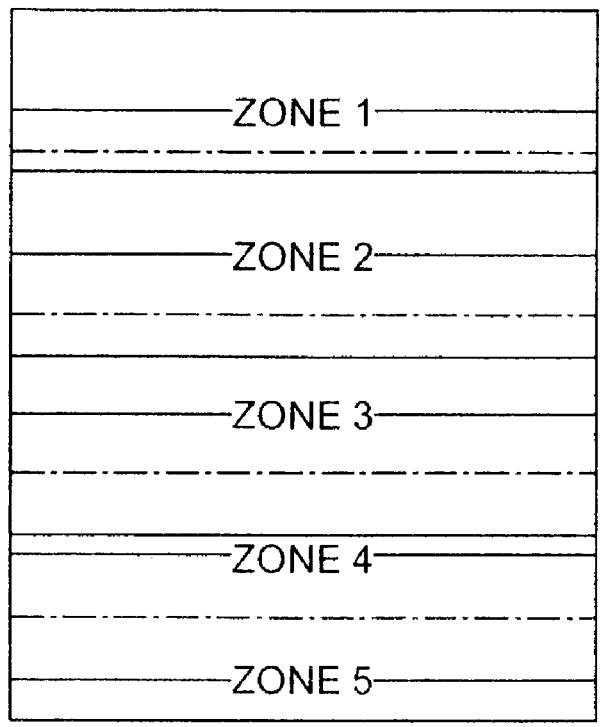
FIG. 7 is an exemplary illustration of an image that has broken up into multiple zones.

FIG. 7 represents a typical example of an image that has been broken up into specific zones (e.g. Zones 1-5 in FIG. 7).

Once it is known how many zones the image will be broken up into, what needs to be determined is how large each zone will be. The width of each zone will always be equal to the width of the gradient magnitude and direction data. The height on the other hand will vary depending upon the box sizes that will be used in each zone. The zones should overlap and each zone should be slightly larger to produce sufficient overlap so that each pixel is examined using a target box centered on that pixel. Consider a target near or on the border of a zone. To capture all of the targets pixels the zone needs to be enlarged by a specified value. This value is equal to one half the height of the largest box size used in that zone. Thus, each zone is characterized by the following equations.

min $n$=min(find(min verPixSize==($v$+$w$)))−($v$+$w$)

max $x$=max(find(min verPixSize==($v$+$w$)))+($v$+$w$)

min $n$_true=min(find(min verPixSize==($v$+$w$)))

max $x$_true=max(find(min verPixSize==($v$+$w$)))

where $v$=min(min verPixSize)
    &$w$=CurrentZoneNumber−1                              (Eq. 4)

Figure 8:
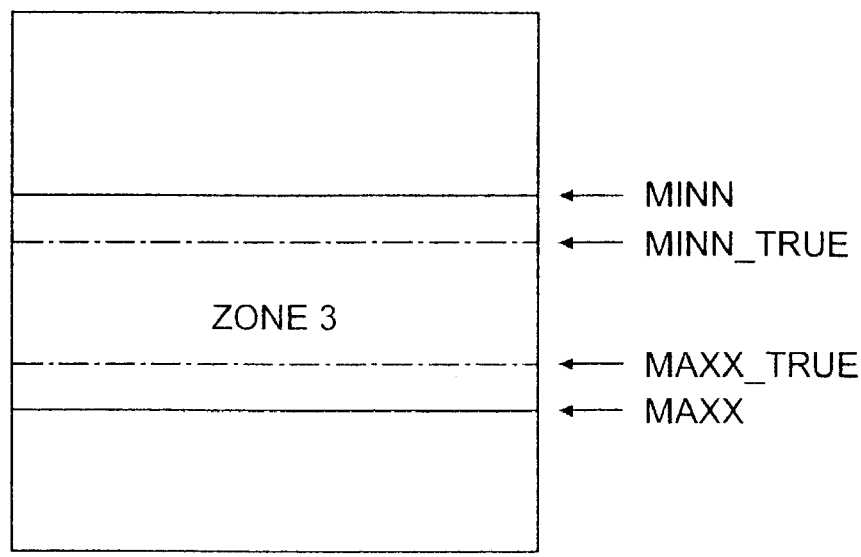
FIG. 8 is an exemplary illustration of close up of a specific zone region.

For example lets look at zone 3 depicted in FIG. 7. FIG. 8 provides further detail of zone 3. The minn and maxx value lines for box 3 respectively overlap boxes 2 and 4. The dashed lines seen in this figure are the minn_true and maxx_true values. All these values are representative of the y location in the imagery. Thus, image zone 3 will be bounded by minn and maxx in the y direction and by the width of the Sobel-_dir_edge image in the x direction.

Row Removal and Atmospheric Attenuation Function

Range based row removal and atmospheric attenuation are functions described with reference to steps 111 and 112 of FIG. 1A. The purpose of the row removal is to zero out the image data in rows beyond a maximum range of interest. The purpose of the atmospheric attenuation is to modify the edge gradient magnitude values based upon calculated atmospheric attenuation values. The atmospheric attenuation values are selected based upon predetermined atmospheric conditions that are likely to be encountered in a given operational scenario where the detection algorithm may be applied. In the situation, where the algorithm is being used where airborne targets will be of interest, then no rows would be zeroed out. This is because the background may be well beyond a useful range but there may be a foreground target of interest that should be considered. This is in contrast to land and sea based targets that are closely related to the range of the earth or water on which they lie. The output is simply an edge image that has been slightly modified.

Range Based Row Removal

To remove rows from the gradient magnitude image, at step 111, a comparison is made between the maxRange (maximum effective range of interest) and rangePerLine (the range of each line as calculated during step 110 variables. In the preferred embodiment the system is intended to provide targeting information to a missile and the range is the missile's effective range as entered into the system as would be understood by one of ordinary skill. For example, this range may be entered into the system before missile launch and then decrement at a fixed rate over elapsed time. A fixed value could also be used for maxRange.

Whenever rangePerLine>maxRange, zero out that line in the imagery. This eliminates portions of the image outside the range of interest. Thus, if one third of the input imagery is beyond the range of interest, this one third of the imagery data would be preferably set to zero so that no further processing of these portions of the image would be performed. In this example, the top third of the image data is zeroed out, thus simplifying processor load. Thus the image data is further simplified.

Atmospheric Attenuation Algorithm

Atmospheric attenuation is performed in step 112 found in FIG. 1A. Once, the gradient magnitude image data has gone through the row removal step 111 then it is weighted to enhance objects that are further away. This weighting step 112 is based upon atmospheric attenuation and can either increase distant values or attenuate closer values. This is accomplished by creating a 256×1 vector array and where the values within the vector array are computed by the following equation.

$$\text{skew} = q \wedge \left(1 - \frac{trl \cdot x}{tr}\right) \quad \text{(Eq. 5)}$$

Where:
q=0.8;
trl is the target range to each line;
tr is the target range to the mid distance pixel; and
x is 1 or a value that increases with increasing atmospheric humidity.

All values of skew must be real.

The operator "^" represents the mathematical operator of "raising to the power" in the above equation.

Figure 9:
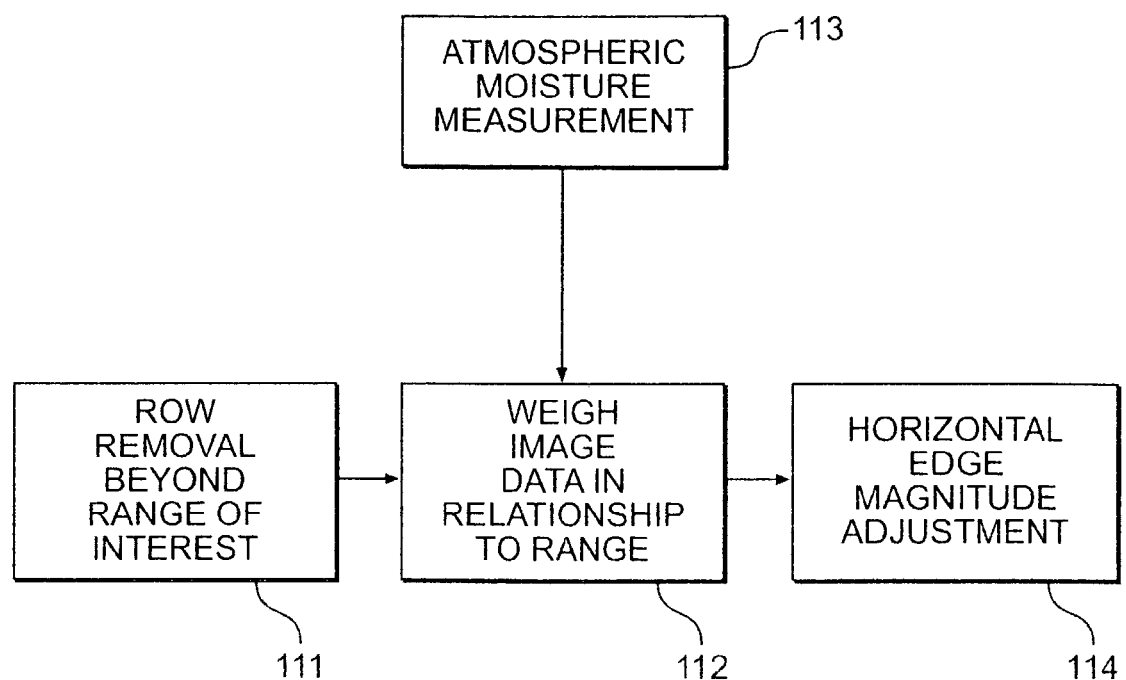
FIG. 9 is an exemplary flowchart showing an alternative embodiment of the step of weighing image data based on range.
Figure 10A:
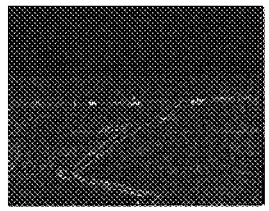
FIG. 10 is an exemplary illustration of the Sobel magnitude image, a skew diagonal image and a Sobel magnitude weighted image.
Figure 10B:
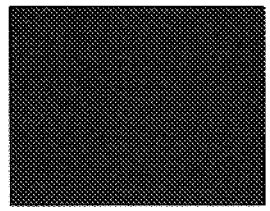
Figure 10C:
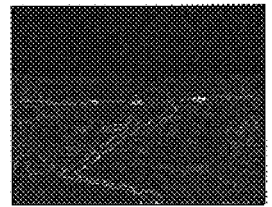

Then, multiply this vector array and the SobelMag 256×256 array together to form the SobelMagWgtd image. In these image descriptors, "Mag" represents "magnitude" and "Wgtd" represents "weighted". This is performed at step 112 of FIG. 9. FIG. 10 shows the result of this process, with FIG. 10A representing the SobelMag image, FIG. 10B representing the skew diagonal image and FIG. 10C representing the SobelMagWgtd Image. As is well known in the art infrared image information is primarily attenuated by moisture in the atmosphere. According to one embodiment of the invention, the value x of the above equation may be used and varied in relationship to atmospheric moisture content. Thus, x would be smaller in humid atmosphere and larger in drier atmosphere. The SobelMAgWgtd magnitude and associated direction data is then provided to a Horizontal Edge Magnitude Adjustment step 114.

Horizontal Edge Magnitude Adjustment

Horizontal edges are often present in an image due to the presence of roads, horizon lines, tree lines and the like. This non-target related edges are desirably attenuated so as to reduce their suppression of adjacent non-horizontal edges that may be parts of a candidate target. This function lessens the influence of horizontal edges present in the image and is performed by Horizontal Edge Magnitude Adjustment step 114 as shown in FIGS. 1A and 9. Attenuating the horizontal lines is beneficial when attempting to pull out segmented targets from an image having strong horizontal edge magnitudes. To help minimize the influence of these horizontal edges the following technique is applied to the gradient magnitude image. In the case of the 8 Direction Sobel Operator, within the edge direction image find all the pixel locations that have a value of 5 or 1 (the vertical values). A horizontal edge has a vertical gradient direction. With these pixels, when downsampling has not occurred, take the intensity based edge magnitude image and multiply the intensity values at the previously mentioned pixel locations by 0.75. In one embodiment, when downsampling has occurred, the intensity based edge magnitude image is not adjusted for horizontal edges.

The image that has been horizontal edge magnitude-adjusted will become the edge magnitude image SobelMagWgtd Image that the remainder of the algorithm will work with.

Threshold Gradient Magnitude

The magnitude threshold function (step 115 of FIG. 1A) thresholds the edge magnitude image so that background clutter is removed while preserving the target detections.

Once, the edge magnitude image has been downsampled and thinned, then the edge magnitude image is thresholded. Thresholding is a way of selecting features within image data that are important to a viewer and emphasizing these features while at the same time de-emphasizing other features.

In the present embodiment, thresholding can be done by two approaches, depending upon the expected target size that will likely be encountered. One approach uses a variable percentage threshold and the other approach uses a fixed percentage threshold. If the average expected target size is less than 5% of the entire image, then the variable threshold method is used. Otherwise, if the average expected target size is greater than 5% of the entire image, then the fixed threshold method is used. Expected target size is determined in one embodiment by comparing the number of pixels in the target box as described above with the total number of pixels on the imagery after downsampling if performed. Those skilled in the art will realize that selecting a percentage can be based upon both experimental and empirical techniques and that other percentages can be used as a basis for implementing selection criteria without deviating from the spirit and scope of the present invention. However, it should be apparent that the variable thresholding used in accordance with the teachings of the present application provides substantial benefits when a target is being identified and during the initial tracking period of operation of the target detection algorithm.

The average expected target size is determined in another embodiment from the following equation:

$$AvgExpectedTgtSize = \frac{round(mean(verPixSize) * mean(horPixSize))}{(256/2^{\wedge}downsample)^{\wedge}2} * 100 \quad \text{(Eq. 6)}$$

Again, note that the operator "^" represents the mathematical operator of "raising to the power" in the above equation. It should be noted however, that any suitable method of determining average target size may be used.

Variable Percentage Threshold Algorithm Description

The variable percentage threshold algorithm used in one embodiment of step 115 of FIG. 1A improves thresholding performance since it utilizes local gradient conditions to determine the threshold for each area of the imagery. The basic intent of this routine is to identify the higher gradient magnitudes. Since higher magnitudes of gradient magnitude represent typically sharper, man-made edges, the thresholding has the effect of separating any man made edges often made by targets from the imagery. The algorithm works on the assumption that man made objects will have in general stronger magnitude edges than those found in nature. Since many images in nature are not static, but instead always changing, a threshold technique was developed which takes advantage of these image characteristics. The algorithm used in one preferred embodiment is explained below. However, any suitable method of varying the threshold to take into account local variations in image intensity may be used. In one alternative embodiment a histogram of the intensity values in a locality of the image data is used to determine the threshold.98

Initially, the variable thresholding technique places all the nonzero pixels in the SobelMagWgtd image (i.e., a Sobel magnitude weighted image) into a vector that is made up of 1 column and a length equal to the total number of pixels. Then, the following equation is used to calculate the variance of these pixels.

$$\sigma = \left( \sqrt{\frac{\sum_{i=1}^{n}(x_i - \bar{x})^2}{n-1}} \right)^2 \quad \text{(Eq. 7)}$$

where $\bar{x}$ is the mean of all the nonzero pixels

In the next step, the image is broken up into 16 equal squares. For example, if the image is 256×256 then break up the image into 16 64×64 squares, if the image is 128×128 then use 32×32 squares, etc. Once the image has been broken up into a selected manner, then the variance of all the nonzero pixels in each of the squares is calculated. Thus the difference between the average gradient magnitude of the image and of each sub-image area (64×64 square is calculated and is used to determine the threshold of that area. By use of a varying threshold, the method and system of the present application is more capable of identifying areas of the image information likely to have targets present therein despite variations in the average Sobel magnitude from sub-image area to sub-image area. Thus, by varying the threshold the Sobel magnitude value is compared to in different areas of the image, targets may be more readily detected in areas of the image having average Sobel magnitude values varying from the average Sobel magnitude value of the image as a whole.

By substituting the sub image pixels for the SobelMagWgtd image pixels, we create the following vector, which has a length of 16.

$$VarianceVector(1:16) = \frac{\sigma(sub\_img(1:16))}{\sigma(sobelMagWgtd)} \quad \text{(Eq. 8)}$$

Once the variance vector has been created, then find the minimum and maximum values of that vector. The objective is to calculate a specific percentage threshold value for each of the 16 squares. For example, a percentage of 3% in a 64×64 square would cause only 123 values to be retained after thresholding. The following exemplary pseudocode presented below accomplishes this goal.

t=minimum value found in VarianceVector;
tt=maximum value found in VarianceVector;
k=[0.4 0.2 0.2 0.1 0.1];
for w=1:16
    d=VarianceVector(w)
    if d does not exists
        dd(w)=0;
    elseif d>(tt-t)*k(4)+(tt-t)*k(3)+(tt-t)*k(2)+(tt-t)*k(1)+t
        dd(w)=3;
    elseif d>=(tt-t)*k(3)+(tt-t)*k(2)+(tt-t)*k(1)+t
        dd(w)=4;
    elseif d>=(tt-t)*k(2)+(tt-t)*k(1)+t
        dd(w)=5;
    elseif d>=(tt-t)*k(1)+t
        dd(w)=6;
    elseif d>=t
        dd(w)=7.

After the percentage values have been calculated for the 16 squares, then a variable threshold image map (VarThreshImgMap) needs to be created for the entire image. This is accomplished by first creating a blank image that is equal to the size of the SobelMagWgtd image. This image will now become the VarThreshImgMap image. First, place the values at center of each of the 16 squares at their associated pixels locations in the VarThreshImgMap image. These values are then used to generate the remaining values on the VarThresImg Map using two-dimensional bi-linear interpolation.

Figure 11:
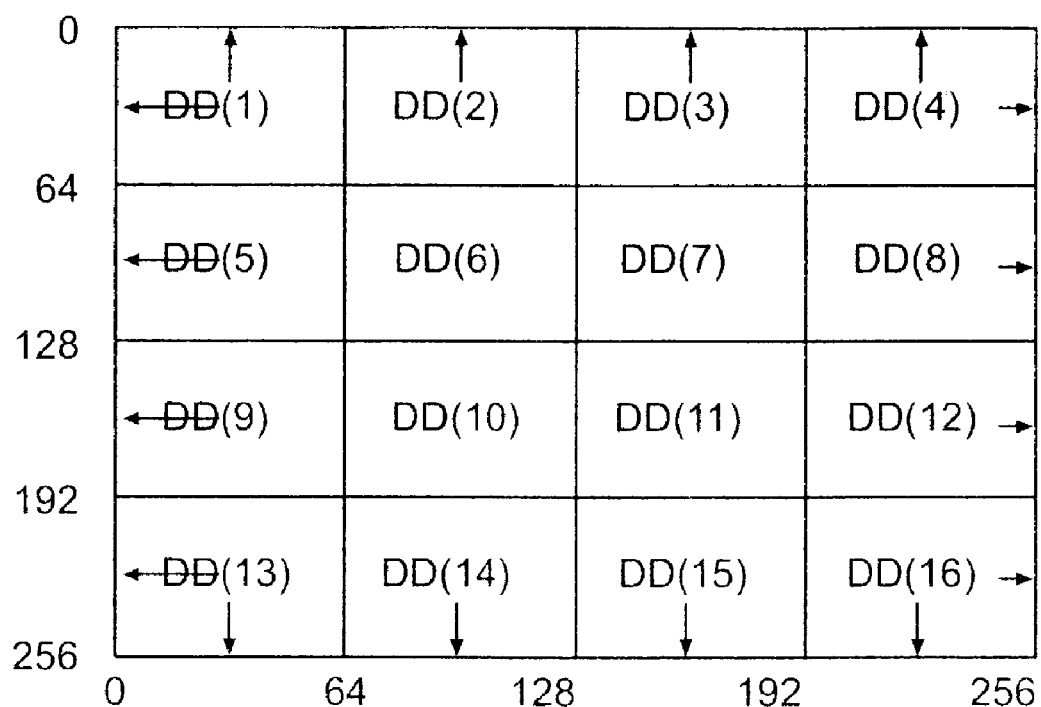
FIG. 11 is an exemplary illustration of a 256×256 variable threshold image map.

FIG. 11 is an illustration of an exemplary 256×256 matrix representing one implementation of the above process, where the arrows are pointing to the other locations where the threshold values of the appropriate adjacent blocks are inserted into the image. These values are set to the values of the centers of the adjacent ones of the 16 squares as explained in the preceding paragraph.

Figure 12:
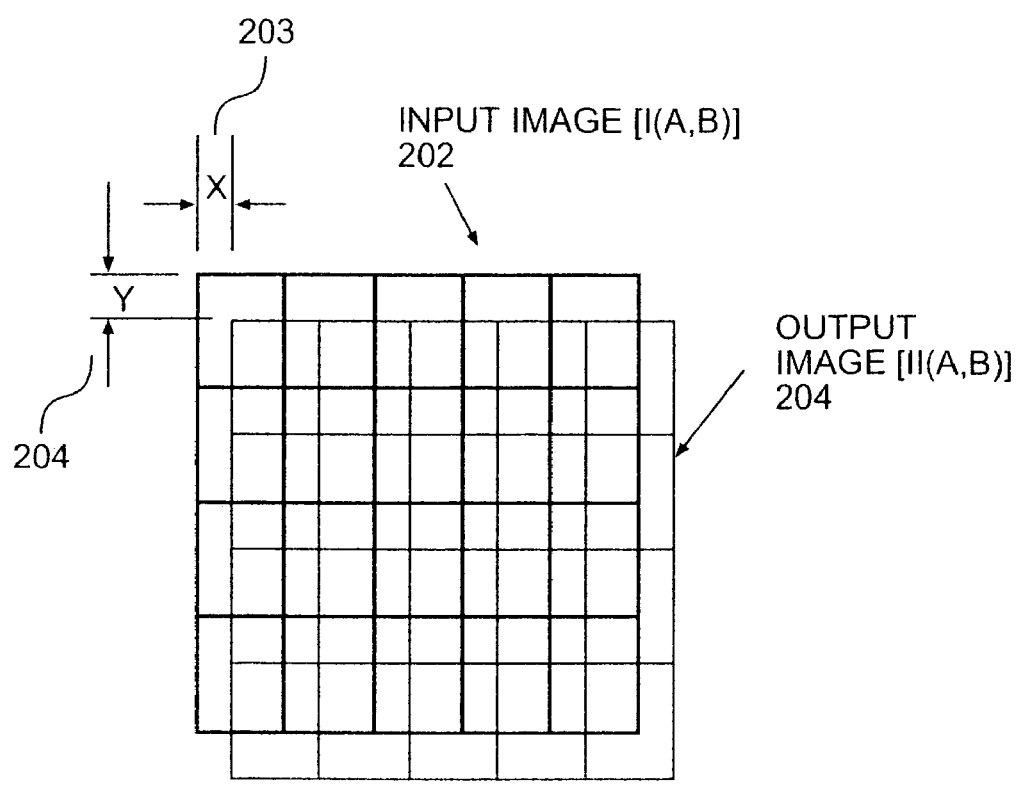
FIG. 12 is an exemplary graphical illustration of bilinear interpolation.

Once the above image is created, two dimensional (2D) bi-linear interpolation is used between the 32 fixed values to generate a threshold value for every pixel in the image. Two dimensional bi-linear interpolation is, in essence, the creation of one pixel from the combined segments of four connected pixels. What is done is a linear interpolation along each row of an image and then those results are linearly interpolated in the column direction. FIG. 12 shows graphically the location of points produced by bilinear interpolation. An input image [I(a,b)] (represented by 202) is converted to an output image [II(a,b)] (represented by 204). The pixel increments in an x-direction are represented by 203 in FIG. 12 and the pixel increments in a y-direction are represented by 205.

The equations that create the individual new pixels for the bilinear interpolated image are defined by the following equations.

$$c = (1-x) \times I(a,b) + x \times I(a+1,b)$$

$$d = (1-x) \times I(a,b+1) + x \times I(a+1,b+1)$$

$$II(a,b) = (1-y) \times c + y \times d \quad \text{(Eq. 9)}$$

where
I(a,b)=VarThreshImgMap Image
II(a,b)=VarThreshImgMap modified Image
x=pixel increments in x direction
y=pixel increments in y direction
These values must fall within the following constraints
if VarThreshImgMap(x,y)>7
  VarThreshImgMap(x,y)=7
if VarThreshImgMap(x,y)<3
  VarThreshImgMap(x,y)=3

So, as an example, given the following values, this is how a threshold value can be determined for an individual pixel.

Figure 13:
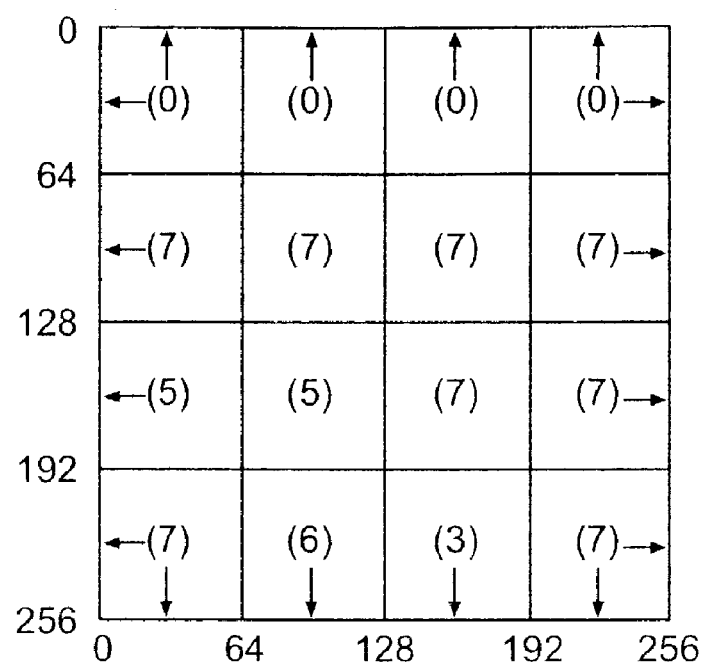
FIG. 13 is an exemplary illustration of determining how a threshold value can be determined for an individual pixel.

FIG. 13 shows how to find the threshold value for x=132, y=117 given the exemplary percentages (dd) values shown in the FIG. 13 matrix.

Thus, using the above defined equations where $$c = \left(1 - \frac{(x-1)}{64}\right) \times 7 + \frac{(x-1)}{64} \times 7 \quad \text{(Eq. 10)}$$

$I(a, b) = dd(6) = 7$ $$d = \left(1 - \frac{(x-1)}{64}\right) \times 5 + \frac{(x-1)}{64} \times 7$$

$I(a+1, b) = dd(7) = 7$ $VarThreshImgMap(x, y) =$ $$\left(1 - \frac{(y-1)}{64}\right) \times c + \frac{(y-1)}{64} \times d$$

$I(a, b+1) = dd(10) = 5$   where $x = 132$ and $y = 117$ $I(a+1, b+1) = dd(11) = 7$   so $VarThreshImgMap(132,117) =$ 6.71289062500000

Figure 14:
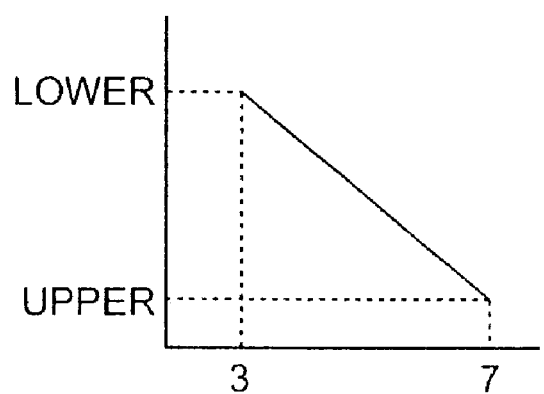
FIG. 14 is an exemplary illustration of a linear interpolation used in the development of transformation equations.

Once, the VarThreshImgMap has been created then a variable intensity pixel image map (VarIntensityImgMap) is created before the SobelMagWgtd image can be thresholded. This image is created in the following manner. First, sort all the nonzero pixels that are in the SobelMagWgtd image into a vector, called t, where the minimum value is located at t(1) and the maximum value is located at t(max). Then, use the following equations to find the pixel intensity value that matches up with the percentage values of 3% and 7%.

upper=$t$(floor(size($t$)*(1−0.07)));

lower=$t$(floor(size($t$)*(1−0.03)));

FIG. 14 is a graphical representation of the above referenced upper and lower determination.

At this point in the algorithm, linear interpolation is used to map a pixel intensity value to each of the percentage threshold values that is found in the VarThreshImgMap image. Linear interpolation is simply the process of finding a point on a given line. Thus, the percentage values are converted to intensity values in the SobelMagWgtd image data that correspond to these intensity values. FIG. 14 and the following equations shows how linear interpolation is used to develop the transformation equation used in this algorithm.

Equation of a line $$y = mx + b \quad \text{(Eq. 11)}$$

where $m = \frac{(y_2 - y_1)}{(x_2 - x_1)} = \frac{(\text{lower} - \text{upper})}{4}$ $y = PixelIntensity(x, y)$ and $x = PixelThreshold(x, y)$ The operator "^" represents the mathematical operator of "raising to the power" in the above equation.

Map Transformation Equation $$PixelIntensity(x, y) = \quad \text{(Eq. 12)}$$

$$-\left(\frac{(\text{Lower} - \text{Upper})}{4} * (PixelThreshold(x, y)) + b\right)$$

where $b = -\left(\text{lower} + \left(\frac{(\text{lower} - \text{upper})}{4} * 3\right)\right)$ Once the transformation equation is developed then all that needs to be done is to apply this equation to every pixel in the VarThreshImgMap image. The end result will then become the VarIntensityImgMap image. FIG. 15 shows this transformation process with 15A representing the VarThreshImgMap image and 15B representing the VarIntensityImgMap for an exemplary data set.

Figure 16A:
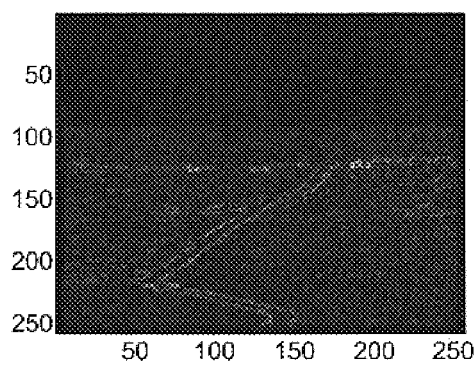
FIG. 16 is an exemplary illustration of a thresholded Sobel-MagWgtd image.
Figure 16B:
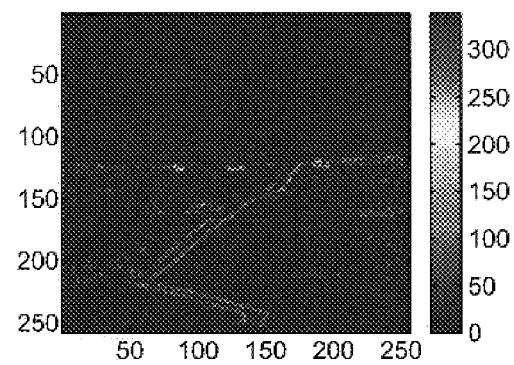

Finally, the thresholding of the image becomes a simple comparison task. For each pixel in the SobelMagWgtd image, the algorithm compares the pixel value at that (x,y) location with the pixel value at the corresponding location in the VarIntensityImgMap image. If the SobelMagWgtd image pixel is greater than or equal to the VarIntensityImgMap image pixel, then the pixels values are kept. Otherwise, zero out the pixel. Thus, after going though every pixel in the image the ends results will be a thresholded SobelMagWgtd image. FIG. 16 provides an illustrative example of the power this threshold approach has in converting an input image 16A into thresholded image data 16B. The gradient direction data may be desirably eliminated in the same way as the gradient magnitude data. Using the thresholding function, the thresholded magnitude and direction data will be a set of only those points in the imagery data where the gradient magnitude has exceeded the threshold.

Fixed Percentage Threshold Algorithm Description

The fixed percentage threshold algorithm of step 115 of FIG. 1A may preferably be used when the average expected target size is greater than about 5% of the image area. Once the target encompasses 5% of the imagery's field of view, then a fixed percentage value is used to threshold the image. This thresholding technique keeps the upper 7% of all valid pixels and the remaining 93% of pixels are zeroed out. By valid pixels what is meant is that any pixels that have a gradient value of zero in the image are not used in the calculation. The percentages are based upon the edge's gradient magnitude values otherwise known as the pixel's intensity value.

The gradient direction data may be desirably eliminated in the same way as the gradient magnitude data. Using the thresholding function, the thresholded magnitude and direction data will be a set of only those points in the imagery data where the gradient magnitude has exceeded the threshold. Thus, the gradient magnitude and direction data is effectively skeletonized, now representing only the gradient magnitudes and directions of the edges of features within the image data. This reduces the processing load of the processor in further analysis and candidate target detection.

Single Pixel Data Elimination

After thresholding is performed, all the pixels that are singular in nature are desirably removed from the magnitude and direction data. A singular pixel is one that has a value but is surrounded by pixels that have been set to zero. This tends to indicate that the value is noise related. To simplify further processing such singular pixels are removed in step 116 by looking in the direction data of the surrounding pixels. If the surrounding pixels have direction values of zero, the pixel under examination has both magnitude and direction data set to zero for that pixel.

Initial Detection, Location Generation

Seed Point Generation Function including Candidate Target Detection Algorithm

Candidate Target Detection is accomplished in step 118. The candidate target step generates a seed point or initial location of a candidate target. The algorithm accomplishes this task by identifying areas where a large diversity of edge directions have occurred. This function uses an edge direction counting algorithm to locate candidate target regions. The edge direction counting algorithm is described in detail in the previously mentioned copending application (LM Ref. EM-1933) filed Mar. 6, 2003 and entitled "Method and System for Identifying Objects in an Image," by Harry C. Lee, assigned to the assignee of the present application ands herein incorporated by reference. Further detail of the edge counting technique may be obtained from the disclosure of this application.

Once uncovered, these locations and the outlines of the candidate targets contained therein may be output at step 120 and used as needed in other processing to identify or classify targets identified as candidate targets in step 118. For example, in one embodiment, the candidate target locations may be passed to the segmenter 122 as illustrated in FIG. 1C for more in-depth analysis as will be described in greater detail herein below.

Stated simply, for each pixel and target box, the edge counting algorithm counts the number of edge directions within the target box by using a simple box sum technique disclosed in greater detail in the above mentioned copending application. A larger number of gradient directions suggests that an envelope of contrasting intensity exists, suggesting a target. When the number of different edge directions in the box exceeds a threshold, a gradient edge outline around an area of similar intensity or blob is found to exist. The use of a target box as the image data subset for this process enhances performance by removing extraneous edges that are outside the size range of a target of interest. Thus, the use of target boxes stepped across the image improves target detection performance.

The Target Box Edge Counting—Candidate Target Detection step 118 makes use of the thresholded image data obtained at the output of step 115. Remember that only those pixels within the image having the largest magnitude (3-7%) are retained in the assumption that a large number of edges, for example 10 or more different directions out of a possible 16 cannot occur in a small region of this data unless it is produced by a closed blob area of similar contrast that should be considered a candidate target. While any number of edge directions may be used, the example of the present application uses 16 for this purpose and defines a blob as an area of the image below a threshold size that contains greater than a predetermined number, in this example 10, of direction values. Through empirical analysis it has been determined that the best number of edges to use as a threshold to detect a candidate target varies with range. Thus in one preferred embodiment, the range causes the number of edges to vary from 10 to 12 depending on range. Thus, each target box is stepped across each pixel in the image data and the box sum technique described in the above mentioned copending application is used to determine the number of edges in the target box at each pixel location within the thresholded image data.

This step, in one preferred embodiment, assigns a single bit position in a binary code to each edge direction. A logical sum operation is performed on all of the pixels within the target box to produce a binary number having "one" bits for each direction which is contained within the target box. This binary logical sum is then used as a count of the number of edges within the target box. In one embodiment, a lookup table is then used to assign a number to the pixel surrounded by the target box representative of the number of edges detected within that target box, if the number exceeds a threshold, e.g. 10 or 12.

As previously explained, use of look up tables may be used to enhance processing speed. The input imagery step 100 prepares look up tables in which the output of the box sum utilized produces a binary number having one bits equal in number to the number of detected edge directions. This is translated in by the look up table to a number of edges which is determined to be zero if less than the detection threshold, typically 10-12. With a threshold of 10, any positions that have a value of less than 10 in the first lookup table are zeroed. In the second lookup table to be used in the seed point generation function, any positions that are less than 12 are zeroed out. These two lookup tables are then saved for later access and later usage in the algorithm,. Note that the numbers 10 and 12 may be selected based on empirical testing. The numbers are representative of the number of unique edges identifying a potential target. It should be apparent that increasing these numbers increase target selectivity but may miss potential targets while lowering these numbers is more inclusive but increases the likelihood of identification of false targets. In one embodiment:

If losTgtRange>4000
  Target is made up of 10 or more edge directions. Thus, the lutt16_10 lookup table will be used for these range values.
If losTgtRange<2500
  Target is made up of 10 or more edge directions. Thus, the lutt16_10 lookup table will be used for these range values.
If losTgtRange<4000 and losTgtRange>2500
  Target is made up of 12 or more edge directions. Thus, the lutt16_12 lookup table will be used for these range values.

Detection Generation will now be further explained and generally corresponds to element 118 of FIG. 1A. This portion of the algorithm segments the image and examines and develops potential targets for classification.

Before the edge direction counting is performed at step 16, the 16-direction image needs to be thresholded. This may be done by the thresholding functions described above or in any other suitable fashion so long as the edge directions are associated only with gradient magnitudes primarily representative of object edges.

Once again, each pixel of the imagery is examined with each target box to be used centered thereon. The edge direction counting algorithm is applied to each target box around each pixel to the thresholded gradient data by eliminating gradient magnitude and direction data where the magnitude is below the magnitude of the threshold in the VarIntensityImgMap. Since the remaining gradient magnitude and direction data is zeroed to produce the thresholded data, the thresholded data does not have gradient direction values associated with minor gradient magnitude changes, the gradient edge data only representing edges in the scene. Consequently, when the number of different directions within the target box exceeds a threshold number, it is representative of a target-sized blob of different image intensity from the surrounding scene representative of a candidate target.

Since the number of different directions in a target box is determined very quickly with relatively little processing load, the entire image may be examined for candidate targets pixel by pixel. After this process is complete, the candidate target data is retained and the data that is not part of a candidate target is eliminated (zeroed out).

For each group of pixels defining a candidate target, the centroid location of that group of pixels is then determined. This is done for all candidate targets. After all the centroid locations have been developed then it is these (x,y) locations (representation of the centroid location) that will be used as the seed points for the segmenter function.

Centroid Location Calculation

Before the segmentation process is started, a centroid of each candidate target must be calculated in step 121 of FIG. 1C. Any suitable method of determining candidate target centroid may be used. The determination of centroid may be as simple are determining the center of all pixels which have produced detection of a candidate target from the same bits of gradient magnitude and edge data. Since the target box may be slightly larger than the target, several pixels may detect the same candidate target. The average of these pixel locations may be chosen as the centroid of that candidate target. However, the method described by the following equations below is generally preferable.

$$x_c = \frac{\sum_{y \in I}\sum_{x \in I}(x \times I(x, y))}{\sum_{y \in I}\sum_{x \in I}(I(x, y))}$$ (Eq. 13)

$$y_c = \frac{\sum_{x \in I}\sum_{y \in I}(y \times I(x, y))}{\sum_{y \in I}\sum_{x \in I}(I(x, y))}$$

Morphological Segmentation

Figure 17:
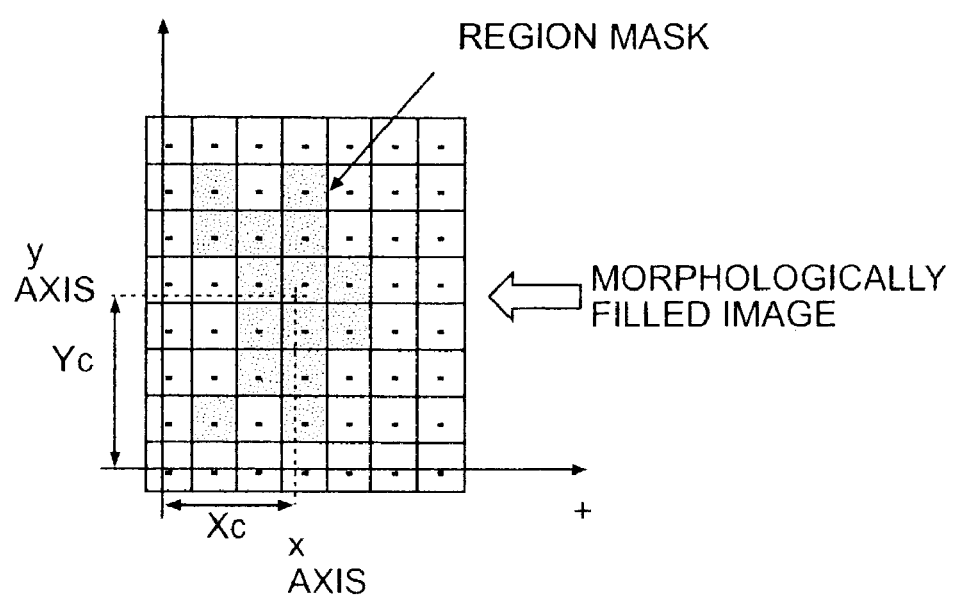
FIG. 17 is an exemplary illustration of a morphologically filled image and a region mask.

The candidate target gradient magnitude information and centroid are output as the output of the candidate target detector of the present application. This information is, in one embodiment, supplied to a morphological based segmenter described in greater detail with reference to copending application 10/330,088 filed Dec. 30, 2002 of Teresa Olson and entitled "Morphological Based Segmenter," assigned to the assignee of the present application. This morphological based segmentation is performed in step 122 of FIG. 1C and generates a region mask, as shown in FIG. 17 representing the target which mask is then used to classify the target using any know technique. The morphological based segmenter represents the pixels that make up the detection found in the morphologically filled image. Each pixel value in the region mask is multiplied by its distance from the edge of the image. This is done for all pixels in the x and y direction. Then, they are summed up in each direction and divided by the total sum of all the pixels intensity in the region mask. Thus, a revised centroid of the region mask is determined in (x,y) coordinates.

Classification

The purpose of the classifier function (step 124 of FIG. 1C) is to take in the selected features of all the remaining detections (candidate detection) and determine from a feature point-of-view that candidate detections are to be labeled as detections and passed out of the pre-screener. Any suitable classifier known in the art may be used. In one embodiment, a Bayes Classifier is preferably used. The purpose of such a classifier is to take the data associated with candidate target nominations and process this information to classify a candidate target as a target and, where possible, identify the type of target. This may be done in accordance with the teachings of the present application. However, the principals and features of the present invention may be used with any suitable classifier 124.

Detector Output

As is shown in step 120 of FIGS. 1A and step 126 of FIG. 1C the outputs of the system of the present application may be provided in any way desired. Preferably, the targets are classified in step 124 and those likely targets are output in terms of their locations, box sizes and features. Further processing on the outputs may be performed if desired. The output may me provided mathematically, as image data or in any suitable fashion for the desired application.

Exemplary Alternate Hardware

Figure 1B:
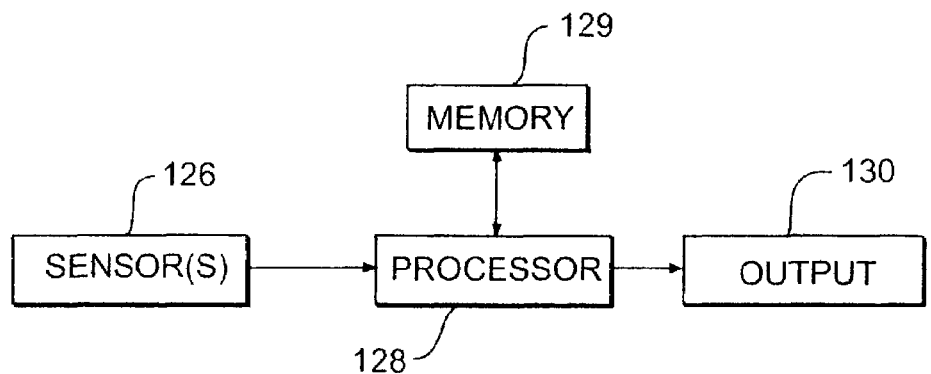
FIG. 1B is an exemplary hardware diagram of one aspect of the method and system of the present application.
Figure 1C:
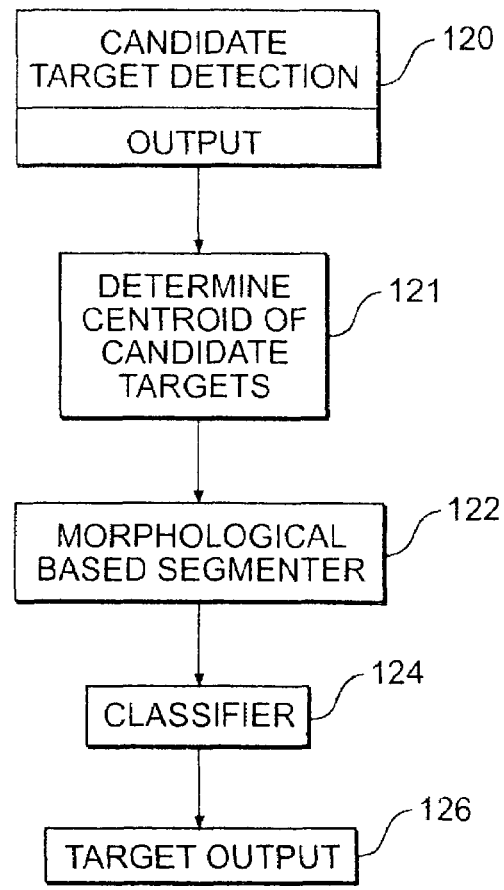
FIG. 1C is an exemplary illustration of the process steps performed in using the output of FIG. 1A.
Figure 18:
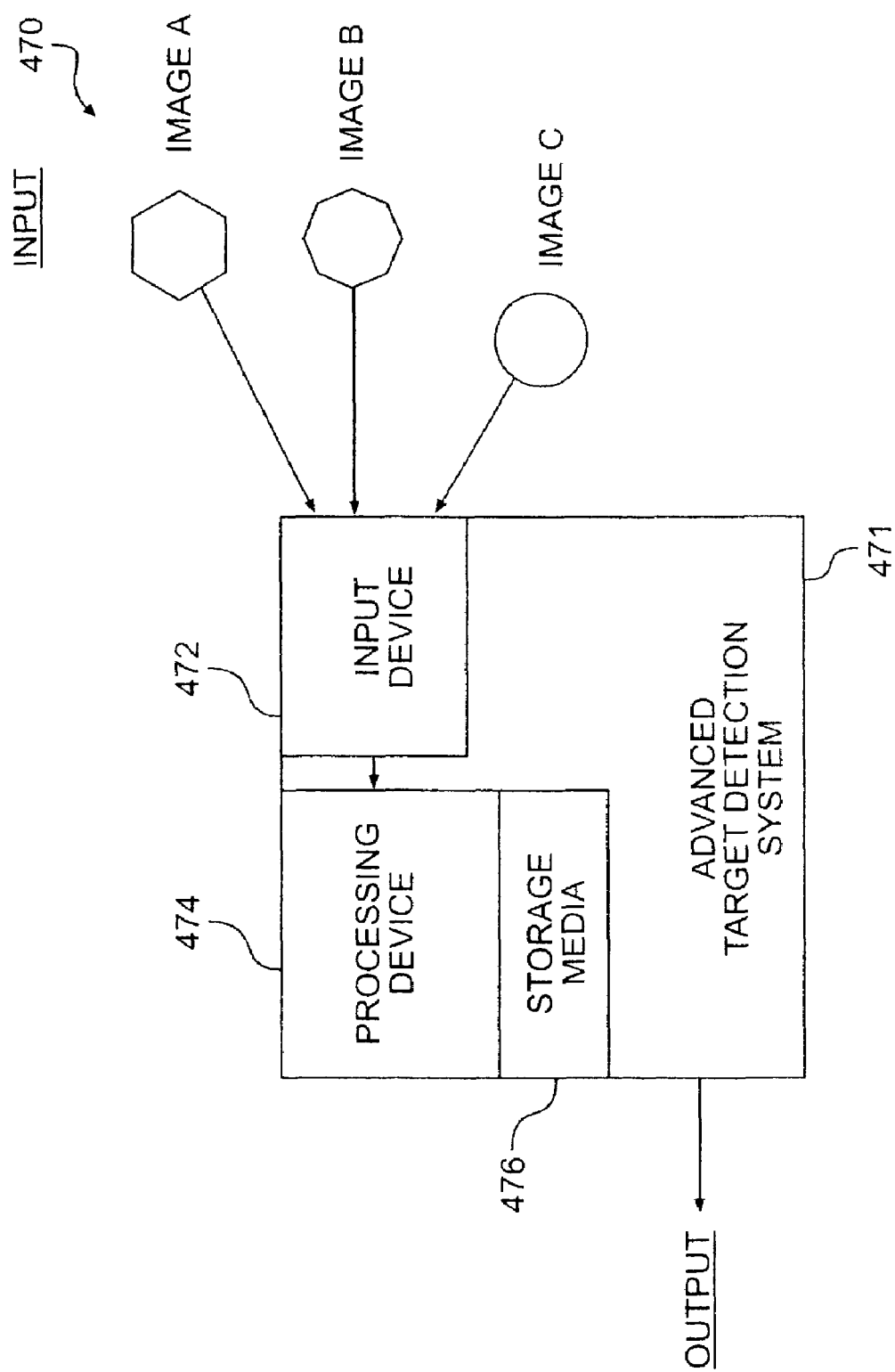
FIG. 18 is an illustration of an exemplary system embodiment of the present invention.

FIG. 18 discloses another exemplary embodiment of an detection system 471 that is different than the one shown in FIG. 1B. In FIG. 18, a means for receiving image data (e.g., input device 472) receives image data from a target as input 470. This data is then forwarded to a processing device 474. The processing device 474 provides necessary hardware for running the detection algorithm.

In FIG. 18, storage media 476 is used to store any data, calculation results, targeting information, intermediary values or any other information that is needed by the processing device 474 during operation. Although not shown in FIG. 18, those skilled in the art will appreciate that the processing device 474 may also have some storage capability and storage media built into it (e.g., RAM on a motherboard) and conversely, the storage media 476 may have some processing capability resident in it.

The invention has been described in connection with a number of exemplary embodiments. Many aspects of the invention can be described in terms of sequences of actions to be performed by elements of a computer-based system. It will be recognized that in each of the embodiments, the various actions and algorithms may be performed by specialized circuits (e.g., discrete logic gates interconnected to perform a specialized function), by program instructions being executed by one or more processors, or by combinations of both. Moreover, the invention can additionally be embodied within any form of a computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of an embodiment may be referred to herein as "logic configured to" perform a described action, or alternatively as "logic that" performs a described action.

It should be noted that the paragraph designations used in the appended method claims are for convenience of reference only and are do not by themselves imply any order to the specified steps.

What is claimed is:

1. A method for detecting targets within an image comprising:
   receiving image data;
   applying a gradient operator to determine gradient magnitude and direction of the pixels of said image data to produce gradient image data;
   skeletonizing the gradient image data to remove unnecessary detail to produce skeletonized image data representing the image primarily by the edges of the objects contained therein;
   applying atmospheric compensation to said gradient image data to adjust the skeletonized image data magnitudes in relationship to range;
   defining at least one target size box related to the expected target size in the image data; establishing a gradient threshold level under which the image data is determined to be unrelated to a target edge;
   thresholding the skeletonized image data by comparing the skeletonized image data magnitudes to said gradient threshold and producing simplified image data representative of edges of image elements when said skeletonized image data magnitude exceeds said gradient threshold determined in said step of establishing; and
   identifying candidate targets within said skeletonized image data by examining the number of different edge directions within the data defined by the target box size surrounding each pixel of each image data element of said simplified image data based on the number of directions of edge image data present in a region of said image.

2. The method of claim 1 wherein said step of applying said gradient operator applies a Sobel operator to said image data.

3. The method of claim 1 further comprising downsampling said image data to reduce data volume prior to processing of the data.

4. The method of claim 1 further comprising attenuating horizontally oriented gradients to attenuate any undue masking effect the horizontal gradients may have on adjacent non-horizontal pixels.

5. The method of claim 4 wherein said step of attenuating is performed before said step of thresholding.

6. The method of claim 1 further comprising the step of removing artifacts within said gradient image data caused by edge effects by padding or clearing edges of the image so that edges of the image have zero data values.

7. The method of claim 1 further comprising simplifying the skeletonized image data by removing rows defining image data beyond a target interest range.

8. The method of claim 1 wherein the target box size defined in said step of defining is one of plural target box sizes related to the expected minimum, average and maximum target box sizes of expected targets.

9. The method of claim 1 further comprising:
   processing the image data of said candidate targets within said image subsets to detect and identify features; and
   applying a classifier function to screen candidate detections and determine a likely target.

10. The method of claim 1 wherein said step of identifying candidate targets determines the number of edge directions in a region using a logical operator.

11. The method of claim 1 wherein, prior to the step of thresholding, single pixels having direction data non adjacent to at least the direction data of an adjacent pixel are zeroed.

12. The method of claim 1 wherein said step of skeletonizing includes thinning detected edges by zeroing out the magnitude and direction data of pixels adjacent to detected edges.

13. The method of claim 1 wherein said step of skeletonizing determines that an edge is present when the gradient magnitude has a localized maximum value in the gradient direction.

14. The method of claim 10 wherein the number of edge directions within a target size box used to identify a candidate target varies with range.

15. The method of claim 1 wherein said vertical and horizontal box size is determined based on an estimate of target data size for each row of the image data and is based on target range.

16. The method of claim 12 wherein the step establishing a gradient threshold level uses a histogram of the gradient magnitude of a box size to determine threshold.

17. The method of claim 12 wherein said percentage threshold varies across the image.

18. The method of claim 17 wherein said percentage threshold is determined as a relationship to localized variance of the gradient image data.

19. The method of claim 1 wherein said gradient threshold is varied based on local gradient variance within the image data of the target size box about each image pixel of said skeletonized image data.

20. A system for detecting targets within an image from image data supplied thereto comprising:
   a gradient processor applying a gradient operator to determine gradient magnitude and direction of the pixels of said image data to produce gradient image data;
   a skeletonizer removing unnecessary detail from the gradient image data to produce skeletonized image data representing the image primarily by the edges of the objects contained therein;
   atmospheric compensator compensating for range related atmospheric attenuation in said gradient image data by adjusting the skeletonized image data magnitudes in an amount related to range;
   a thresholder eliminating data that falls below a predetermined threshold within the skeletonized image data by comparing the skeletonized image data magnitudes to a gradient threshold and producing simplified image data representative of edges of image elements when said skeletonized image data magnitude exceeds said gradient threshold, the gradient threshold being determined to eliminate data having gradient values lower than that expected from a target edge; and
   a candidate target identifier identifying candidate targets by examining the number of edge directions within the data defined by the target box size surrounding each pixel of said simplified image data based on the number of directions of edge image data present in a region of said image.

21. The system of claim 20 wherein said gradient processor applies a Sobel operator to said image data.

22. The system of claim 20 further comprising a data downsampler downsampling said image data to reduce data volume prior to processing of the data.

23. The system of claim 20 further comprising a horizontal edge attenuator attenuating horizontally oriented gradients to attenuate any undue masking effect the horizontal gradients may have on adjacent non-horizontal pixels.

24. The system of claim 23 wherein said horizontal edge attenuator operates on said data prior to supply to said thresholder.

25. The system of claim 20 further comprising a edge zeroer providing zeros at the edge of said image data to prevent within said gradient image data caused by edge effects by padding or clearing edges of the image so that edges of the image have zero data values.

26. The system of claim 20 further comprising a data simplifier removing rows of the skeletonized image data defining image data beyond a target interest range.

27. The system of claim 20 wherein the target box size used by said candidate target identifier is one of plural target box sizes related to the expected minimum, average and maximum target box sizes of expected targets.

28. The system of claim 20 further comprising:
a feature identifier processing the image data of said candidate targets within said image subsets to detect and identify features; and
a classifier applying a classifier function to screen candidate detections and determine a likely target.

29. The system of claim 20 further comprising a single pixel data eliminator, provided before said thresholder, for zeroing single pixels having direction data non adjacent to at least the direction data of one adjacent pixel.

30. The system of claim 20 wherein said skeletonizer thins image edges by zeroing out the magnitude and direction data of pixels adjacent to detected edges.

31. The system of claim 20 wherein said threshold used by said thresholded varies across the image.

32. The system of claim 31 wherein said thresholder determines the threshold at each location in the image based on localized variance of the gradient image data.

33. The method of claim 32 wherein said gradient threshold used n said thresholder is varied based on local gradient variance within the image data of the target size box about each image pixel of said skeletonized image data.

34. In a computer processing environment, a computer data storing medium storing a computer program, the computer program, when controlling the computer processing environment, performing the steps of:
receiving image data;
applying a gradient operator to determine gradient magnitude and direction of the pixels of said image data to produce gradient image data;
skeletonizing the gradient image data to remove unnecessary detail to produce skeletonized image data representing the image primarily by the edges of the objects contained therein;
applying atmospheric compensation to said gradient image data to adjust the skeletonized image data magnitudes in relationship to range;
defining at least one target size box related to the expected target size in the image data;
establishing a gradient threshold level under which the image data is determined to be unrelated to a target edge;
thresholding the skeletonized image data by comparing the skeletonized image data magnitudes to said gradient threshold and producing simplified image data representative of edges of image elements when said skeletonized image data magnitude exceeds said gradient threshold determined in said step of establishing; and
identifying candidate targets within said skeletonized image data by examining the number of different edge directions within the data defined by the target box size surrounding each pixel of each image data element of said simplified image data based on the number of directions of edge image data present in a region of said image.

35. A method for detecting targets within an image comprising:
receiving image data;
applying a gradient operator to determine gradient magnitude and direction of the pixels of said image data;
establishing a gradient threshold level under which the image data is determined to be unrelated to a target edge, said gradient threshold being varied based on local gradient variance within the image data of a single image view;
comparing the gradient magnitude of said image data to said gradient threshold to produce simplified image data representative of edges of image elements; and
identifying candidate targets within said image based on the number of directions of edge image data present in a region of said image, wherein
said step of comparing eliminates the gradient magnitude and direction data of pixels having gradient magnitude data below the gradient threshold.

36. The method of claim 35 further comprising:
identifying targets from said identified candidate targets.

37. The method of claim 35 wherein said step of identifying candidate targets includes the substeps of,
determining a target box size related to expected size of the targets to be detected,
determining the number of directions of edge image data present within the gradient direction data in said target box, and
identifying a candidate target if the number of directions of edge image data exceeds a threshold.

38. The method of claim 37 wherein said step of identifying includes the substep of determining a target box size less than the entirety of the image data, wherein said local threshold is determined from a histogram of gradient magnitude with the target box.

39. The method of claim 35 wherein the step of establishing a gradient threshold level includes the substeps of,
i) determining a portion of pixels within the subset of the image to be retained to determine a threshold value for each subset of said image, the threshold value being related to local conditions of the pixel magnitude data,
ii) repeating said steps i) and ii) for all subsets of the image to establish threshold values for each subset of the image,
iii) associating the threshold values of each subset with a pixel at the center of the subset to produce a threshold value table for pixels in said image data,
iv) performing two dimensional bi-linear interpolation on the threshold values in said substep iii) to associate a threshold value with each of the pixels.

40. The method of claim 39 wherein said step i) of determining determines a percentage value of pixels to be retained in the subset to produce a percentage threshold value, the method including the substep of v) converting each percentage threshold value to an image magnitude threshold value that will retain the desired percentage of pixels when applied.

41. The method of claim 39 wherein said step of establishing a gradient threshold level includes the substep vi) of determining a localized gradient magnitude variance within a subset of the image to determine a percentage threshold value for that subset of the image data.

42. A system for detecting targets within an image from received image data comprising:

a gradient processor applying a gradient operator to determine gradient magnitude and direction of the pixels of said image data to produce gradient image data;

a threshold determiner establishing a gradient threshold level under which the image data is determined to be unrelated to a target edge, said gradient threshold being varied based on local gradient variance within the image data of a single image view;

a thresholder comparing the gradient magnitude of said image data to said gradient threshold produced by said threshold determiner to produce simplified image data representative of edges of image elements; and a candidate target identifier identifying candidate targets by examining the number of edge directions within the data present in a region of said image, wherein said thresholder eliminates the gradient magnitude and direction data of pixels having gradient magnitude data below the gradient threshold.

43. The system of claim 42 further comprising:
a target identifier identifying targets from said candidate targets identified by said candidate target identifier.

44. The system of claim 42 wherein said candidate target identifier includes,
a target box size definer defining a target box size related to expected size of the targets to be detected,
a summer counting the number of directions of edge image data present within the gradient direction data in said target box, and
said candidate target identifier identifying a candidate target if the number of directions of edge image data exceeds a threshold.

45. The system of claim 44 wherein the target box size definer defines a target box size less than the entirety of the image data, wherein said gradient threshold is determined from a histogram of gradient magnitude with the target box.

46. The method of claim 42 wherein said threshold determiner includes,
a region thresholder determining a threshold value for each subset of said image, the threshold value being related to local conditions of the pixel magnitude data, said region value thresholder associating the threshold values of each subset with a pixel at the center of the subset to produce a threshold value table for pixels in said image data,
a two dimensional bi-linear interpolator performing interpolation on the threshold values in said substep iii) to associate a threshold value with each of the pixels.

47. The system of claim 45 wherein said threshold determiner determines the threshold for a subset of the image data based on a localized gradient magnitude variance within that subset of the image.

48. In a computer processing environment, a computer data storing medium storing a computer program, the computer program, when controlling the computer processing environment, performing the steps of:
receiving image data;
applying a gradient operator to determine gradient magnitude and direction of the pixels of said image data;
establishing a gradient threshold level under which the image data is determined to be unrelated to a target edge, said gradient threshold being varied based on local gradient variance within the image data of a single image view;
comparing the gradient magnitude of said image data to said gradient threshold to produce simplified image data representative of edges of image elements; and identifying candidate targets within said image based on the number of directions of edge image data present in a region of said image, wherein
said step of comparing eliminates the gradient magnitude and direction data of pixels having gradient magnitude data below the gradient threshold.

49. A method for detecting targets within an image comprising:
receiving image data;
simplifying the image data to remove unnecessary detail to produce simplified image data representing the image primarily by the edges of the objects contained therein;
applying atmospheric compensation to said simplified image data to adjust the simplified image data magnitudes in an amount related to range, and
examining the simplified image data to investigate the presence of candidate targets therein, wherein
the step of applying the atmospheric compensation varies the amount of compensation in relationship to the amount of moisture in the atmosphere.

50. The method of claim 49 further comprising the step of attenuating horizontally oriented edges in said simplified image data to attenuate any undue masking effect they may have on adjacent non-horizontal pixels.

51. The method of claim 50 wherein the step of simplifying the image data includes the substep of applying a gradient operator to determine gradient magnitude and direction of the pixels of said image data to produce gradient image data;
said method further comprising the step of attenuating horizontal elements of the image by attenuating the magnitude of gradient magnitude data where the direction data indicates a vertical gradient representing a generally horizontal edge in said image data.

52. A system for detecting targets within an image from received image data comprising:
a simplifier simplifying the image data by removing unnecessary detail to produce simplified image data representing the image primarily by the edges of the objects contained therein;
an atmospheric compensator applying atmospheric compensation to said simplified image data to adjust the simplified image data magnitudes in an amount related to range, and
a candidate target identifier examining the simplified image data to investigate the presence of candidate targets therein, wherein
the atmospheric compensator varies the amount of compensation in relationship to the amount of moisture in the atmosphere.

53. The system of claim 52 further comprising:
a horizontal edge compensator attenuating horizontally oriented edges in said simplified image data to attenuate any undue masking effect they may have on adjacent non-horizontal pixels.

54. The system of claim 52 further comprising a gradient processor applying a gradient operator to determine gradient magnitude and direction of the pixels of said image data to produce gradient image data.

55. The system of claim 49 wherein the atmospheric compensator varies the amount of compensation in relationship to the amount of moisture in the atmosphere.

56. A method for detecting targets within an image comprising: receiving image data;
producing a target box sized in relation to the expected target size within the image data;
examining the image data defined by the target box surrounding a pixel of said image data to investigate the presence of a target within the target box surrounding that pixel by processing the image data within said target box to determine the presence of a candidate target; and repeating the step of examining for pixels within the image view, wherein said target box is somewhat greater than the expected target size in the image at that pixel, said step of producing produces plural target boxes of sizes differing in at least one dimension, said target boxes vary in size with varying range, and said image data is divided into zone of similar range to the pixels thereof, the target box size of a given target box being constant within a zone but varying between zones.

57. The method of claim 56 wherein said plural target boxes have box sizes which differ in relation to the change of target shape when viewed from differing dimensions, the step of examining being performed with each of the plural target boxes of differing sizes.

58. The method of claim 56 wherein said step of examining includes the substeps of, applying a gradient operator to determine gradient magnitude and direction of the pixels of said image data to produce gradient image data, skeletonizing the gradient image data to remove unnecessary detail to produce skeletonized image data representing the image primarily by the edges of the objects contained therein, comparing said gradient magnitude data to a threshold and eliminating data falling below the threshold, determining the number of directions of edge image data present within the skeletonized data in said target box, and identifying a candidate target if the number of directions of edge image data exceeds a threshold.

59. A system for detecting targets within an image from image data thereof comprising:

a target box generator producing a target box sized in relation to the expected target size within the image data;

a candidate target detector examining the image data defined by the target box surrounding a pixel of said image data to investigate the presence of a target within the target box surrounding that pixel by processing the image data within said target box to determine the presence of a candidate target, the examination of the image data being performed for each pixel of the data, wherein said target box generator produces plural target boxes of sizes differing in at least one dimension, and said target box generator produces target boxes vary in size with varying range.

60. The system of claim 59 wherein said target box is somewhat greater than the expected target size in the image at that pixel.

61. The system of claim 59 wherein said plural target boxes have box sizes which differ in relation to the change of target shape when viewed from differing dimensions, said candidate target detector examining the image data with each of the plural target boxes of differing sizes.

62. The system of claim 59 wherein said candidate target detector includes, a gradient processor applying a gradient operator to determine gradient magnitude and direction of the pixels of said image data to produce gradient image data, a skeletonizer skeletonizing the gradient image data to remove unnecessary detail to produce skeletonized image data representing the image primarily by the edges of the objects contained therein, a thresholder comparing said gradient magnitude data to a threshold and eliminating data falling below the threshold, a logical processor determining the number of directions of edge image data present within the skeletonized data in said target box, and said candidate target detector identifying a candidate target if the number of directions of edge image data determined by said logical processor exceeds a threshold.

63. The system of claim 59 wherein said target box generator varies target box size by dividing image data into zones of similar range to the pixels thereof, the target box size of a given target box being constant within a zone but varying between zones.

64. In a computer processing environment, a computer data storing medium storing a computer program, the computer program, when controlling the computer processing environment, performing the steps of:

receiving image data;

producing a target box sized in relation to the expected target size within the image data;

examining the image data defined by the target box surrounding a pixel of said image data to investigate the presence of a target within the target box surrounding that pixel by processing the image data within said target box to determine the presence of a candidate target; and repeating the step of examining for pixels within the image view, wherein said target box is somewhat greater than the expected target size in the image at that pixel, said step of producing produces plural target boxes of sizes differing in at least one dimension, said target boxes vary in size with varying range, and said image data is divided into zone of similar range to the pixels thereof, the target box size of a given target box being constant within a zone but varying between zones.

65. A method for detecting targets within an image comprising:

receiving image data;

simplifying the image data to remove unnecessary detail to produce simplified image data representing the image primarily by the edges of the objects contained therein;

attenuating horizontally oriented edges in said simplified image data to attenuate any undue masking effect they may have on adjacent non-horizontal pixels;

examining the simplified image data to investigate the presence of candidate targets therein, and applying atmospheric compensation to said simplified image data to attenuate skeletonized image data magnitudes in an amount inversely related to range.

66. The method of claim 65 further comprising the step of applying a gradient operator to determine gradient magnitude and direction of the pixels of said image data to produce gradient image data;

said step of attenuating the magnitude of gradient magnitude data where the direction data indicates a vertical gradient representing a generally horizontal edge in said image data.

67. The method of claim 65 wherein the step of examining includes the sub steps of, applying a gradient operator to determine gradient magnitude and direction of the pixels of said image data to produce gradient image data, defining at least one target size box related to the expected target size in the image data, establishing a gradient threshold level under which the image data is determined to be unrelated to a target edge, thresholding the skeletonized image data by comparing the skeletonized image data magnitudes to said gradient threshold and producing simplified image data representative of edges of image elements when said skeletonized image data magnitude exceeds said gradient threshold, identifying candidate targets within said skeletonized image data by examining the number of different edge directions within the data defined by the target box size surrounding each pixel of each image data element of said simplified image data based on the number of directions of edge image data present in a region of said image, and repeating the step of examining for pixels within the image view.

68. A system for detecting targets within an image from image data thereof comprising:

a simplifier simplifying the image data to remove unnecessary detail to produce simplified image data representing the image primarily by the edges of the objects contained therein;

a horizontal edge attenuator attenuating horizontally oriented edges in said simplified image data to attenuate any undue masking effect they may have on adjacent non-horizontal pixels;

a candidate target examiner examining the simplified image data to investigate the presence of candidate targets therein, and an atmospheric compensator applying atmospheric compensation to said simplified image data to attenuate skeletonized image data magnitudes in an amount inversely related to range.

69. The system of claim 68 further comprising a gradient processor applying a gradient operator to determine gradient magnitude and direction of the pixels of said image data to produce gradient image data;

said horizontal edge attenuator attenuating the magnitude of gradient magnitude data where the direction data indicates a vertical gradient representing a generally horizontal edge in said image data.

70. The system of claim 68 wherein said candidate target examiner includes, a gradient processor applying a gradient operator to determine gradient magnitude and direction of the pixels of said image data to produce gradient image data, a target box definer defining at least one target size box related to the expected target size in the image data, a threshold determiner establishing a gradient threshold level under which the image data is determined to be unrelated to a target edge, a thresholder thresholding the skeletonized image data by comparing the skeletonized image data magnitudes to said gradient threshold and producing simplified image data representative of edges of image elements when said skeletonized image data magnitude exceeds said gradient threshold, said candidate target identifier identifying candidate targets within said skeletonized image data by examining the number of different edge directions within the data defined by the target box size surrounding each pixel of each image data element of said simplified image data based on the number of directions of edge image data present in a region of said image.

71. In a computer processing environment, a computer data storing medium storing a computer program, the computer program, when controlling the computer processing environment, performing the steps of:

receiving image data;

simplifying the image data to remove unnecessary detail to produce simplified image data representing the image primarily by the edges of the objects contained therein;

attenuating horizontally oriented edges in said simplified image data to attenuate any undue masking effect they may have on adjacent non-horizontal pixels; and examining the simplified image data to investigate the presence of candidate targets therein and applying atmospheric compensation to said simplified image data to attenuate skeletonized image data magnitudes in an amount inversely related to range.

72. In a computer processing environment, a computer data storing medium storing a computer program, the computer program, when controlling the computer processing environment, performing the steps of:

receiving data;

simplifying the image data to remove unnecessary detail to produce simplified mage data representing the image primarily by the edges of the objects contained therein;

applying atmospheric compensation to said simplified image data to adjust the simplified image data magnitude in an amount related to range, and examining the simplified image data to investigate the presence of candidate targets therein, wherein the step of applying the atmospheric compensation varies the amount of compensation in relationship to the amount of moisture in the atmosphere.

* * * * *